US012529891B2

(12) United States Patent
Ronen

(10) Patent No.: US 12,529,891 B2
(45) Date of Patent: Jan. 20, 2026

(54) OPTICAL SYSTEMS AND METHODS FOR EYE TRACKING BASED ON EYE IMAGING VIA COLLIMATING ELEMENT AND LIGHT-GUIDE OPTICAL ELEMENT

(71) Applicant: Lumus Ltd., Ness Ziona (IL)

(72) Inventor: Eitan Ronen, Rechovot (IL)

(73) Assignee: Lumus Ltd., Ness Ziona (IL)

( * ) Notice: Subject to any disclaimer, the term of this patent is extended or adjusted under 35 U.S.C. 154(b) by 301 days.

(21) Appl. No.: 18/036,416

(22) PCT Filed: Dec. 9, 2021

(86) PCT No.: PCT/IL2021/051466
§ 371 (c)(1),
(2) Date: May 11, 2023

(87) PCT Pub. No.: WO2022/130372
PCT Pub. Date: Jun. 23, 2022

(65) Prior Publication Data
US 2024/0004189 A1 Jan. 4, 2024

Related U.S. Application Data

(60) Provisional application No. 63/126,551, filed on Dec. 17, 2020.

(51) Int. Cl.
*G02B 27/00* (2006.01)
*F21V 8/00* (2006.01)
*G02B 27/14* (2006.01)

(52) U.S. Cl.
CPC ....... *G02B 27/0093* (2013.01); *G02B 6/0036* (2013.01); *G02B 6/0038* (2013.01);
(Continued)

(58) Field of Classification Search
CPC G02B 27/0093; G02B 6/0036; G02B 6/0038; G02B 6/0076; G02B 6/0088;
(Continued)

(56) References Cited

U.S. PATENT DOCUMENTS 3,969,023 A 7/1976 Brandt et al.
4,720,189 A 1/1988 Heynen et al.
(Continued)

FOREIGN PATENT DOCUMENTS

CN 101311772 A 11/2008
CN 104570353 A 4/2015
(Continued)

OTHER PUBLICATIONS

C.B. Owen et al "Display-relative calibration for optical see-through head-mounted displays" Published in: Third IEEE and ACM International Symposium on Mixed and Augmented Reality—https://ieeexplore.ieee.org/document/1383044.
(Continued)

*Primary Examiner* — Dmitriy Bolotin
(74) *Attorney, Agent, or Firm* — Rivka Friedman

(57) ABSTRACT

A light-transmitting substrate is deployed with a first of two major surfaces in facing relation to an eye of a viewer and guides light by internal reflection between the two major surfaces. An optical coupling-out configuration couples image light, that corresponds to a collimated image and that is guided by internal reflection between the two major surfaces, out of the light-transmitting substrate. A first optical coupling configuration collimates light from the eye to produce collimated light, and couples the collimated light into the light-transmitting substrate for guiding by internal reflection. A second optical coupling configuration couples the collimated light out of the light-transmitting substrate toward an optical sensor that senses the coupled-out light. A
(Continued)

processing system derives current gaze direction of the eye by processing signals from the optical sensor.

13 Claims, 10 Drawing Sheets

(52) U.S. Cl.
 CPC .......... *G02B 6/0076* (2013.01); *G02B 6/0088* (2013.01); *G02B 27/144* (2013.01)
(58) Field of Classification Search
 CPC .......... G02B 27/144; G02B 2027/0178; G02B 27/0172; G06F 3/013; A61B 3/0008; A61B 3/113
 See application file for complete search history.

(56) References Cited

U.S. PATENT DOCUMENTS

| | | | |
|---|---|---|---|
| 6,215,460 B1 | 4/2001 | Mizoguchi et al. | |
| 6,239,771 B1 | 5/2001 | Usuki et al. | |
| 6,268,883 B1 | 7/2001 | Zehnder et al. | |
| 6,580,529 B1 | 6/2003 | Amitai et al. | |
| 6,879,443 B2 | 4/2005 | Spitzer et al. | |
| 7,612,879 B2 | 11/2009 | Stumpe et al. | |
| 7,724,409 B2 | 5/2010 | Lin et al. | |
| 7,872,217 B2 | 1/2011 | Kasahara | |
| 8,016,428 B2 | 9/2011 | Kasazumi et al. | |
| 8,405,573 B2 | 3/2013 | Lapidot et al. | |
| 9,311,883 B2 | 4/2016 | Cajigas et al. | |
| 9,509,939 B2 | 11/2016 | Henion et al. | |
| 9,569,897 B2 | 2/2017 | Miyawaki et al. | |
| 9,638,920 B2 | 5/2017 | Bohn | |
| 9,804,396 B2 | 10/2017 | Amitai | |
| 11,425,829 B2 | 8/2022 | Zheng et al. | |
| 2002/0186179 A1 | 12/2002 | Knowles | |
| 2003/0165017 A1 | 9/2003 | Amitai | |
| 2004/0032660 A1 | 2/2004 | Amitai | |
| 2004/0033528 A1 | 2/2004 | Amitai | |
| 2004/0080718 A1 | 4/2004 | Kojima | |
| 2004/0212775 A1 | 10/2004 | Faris | |
| 2005/0078388 A1 | 4/2005 | Amitai | |
| 2005/0083592 A1 | 4/2005 | Amitai | |
| 2005/0180687 A1 | 8/2005 | Amitai | |
| 2005/0281515 A1 | 12/2005 | Togami | |
| 2007/0091445 A1 | 4/2007 | Amitai | |
| 2007/0097513 A1 | 5/2007 | Amitai | |
| 2007/0155277 A1 | 7/2007 | Amitai | |
| 2007/0159673 A1 | 7/2007 | Freeman et al. | |
| 2007/0165192 A1 | 7/2007 | Prior | |
| 2008/0025667 A1 | 1/2008 | Amitai | |
| 2008/0106775 A1 | 5/2008 | Amitai et al. | |
| 2008/0151379 A1 | 6/2008 | Amitai | |
| 2008/0186604 A1 | 8/2008 | Amitai | |
| 2008/0192239 A1 | 8/2008 | Otosaka | |
| 2008/0198471 A1 | 8/2008 | Amitai | |
| 2008/0278812 A1 | 11/2008 | Amitai | |
| 2008/0285140 A1 | 11/2008 | Amitai | |
| 2009/0052046 A1 | 2/2009 | Amitai | |
| 2009/0052047 A1 | 2/2009 | Amitai | |
| 2009/0097127 A1 | 4/2009 | Amitai | |
| 2009/0122414 A1 | 5/2009 | Amitai | |
| 2009/0153437 A1 | 6/2009 | Aharoni | |
| 2010/0077049 A1 | 3/2010 | Appelman et al. | |
| 2010/0110368 A1 | 5/2010 | Chaum | |
| 2010/0171680 A1 | 7/2010 | Lapidot et al. | |
| 2010/0202048 A1 | 8/2010 | Amitai | |
| 2010/0214635 A1 | 8/2010 | Sasaki et al. | |
| 2011/0050547 A1 | 3/2011 | Mukawa | |
| 2011/0176218 A1 | 7/2011 | Noui | |
| 2011/0304828 A1 | 12/2011 | Khechana et al. | |
| 2012/0062445 A1 | 3/2012 | Haddick et al. | |
| 2012/0179369 A1 | 7/2012 | Lapidot et al. | |
| 2012/0212484 A1* | 8/2012 | Haddick ................ | G06Q 30/02 345/419 |
| 2012/0212499 A1* | 8/2012 | Haddick ............ | G02B 27/0093 345/589 |
| 2013/0022220 A1 | 1/2013 | Dong et al. | |
| 2013/0128230 A1 | 5/2013 | Macnamara | |
| 2013/0229717 A1 | 9/2013 | Amitai | |
| 2013/0276960 A1 | 10/2013 | Amitai | |
| 2013/0279017 A1 | 10/2013 | Amitai | |
| 2014/0014065 A1 | 1/2014 | Hayashi et al. | |
| 2014/0027232 A1 | 1/2014 | Mccollum | |
| 2014/0118813 A1 | 5/2014 | Amitai et al. | |
| 2014/0118836 A1 | 5/2014 | Amitai et al. | |
| 2014/0118837 A1 | 5/2014 | Amitai et al. | |
| 2014/0126051 A1 | 5/2014 | Amitai et al. | |
| 2014/0126052 A1 | 5/2014 | Amitai et al. | |
| 2014/0126056 A1 | 5/2014 | Amitai et al. | |
| 2014/0126057 A1 | 5/2014 | Amitai et al. | |
| 2014/0126175 A1 | 5/2014 | Amitai et al. | |
| 2014/0198017 A1 | 7/2014 | Lamb et al. | |
| 2015/0035481 A1 | 2/2015 | Cho et al. | |
| 2015/0070864 A1 | 3/2015 | Rainer et al. | |
| 2015/0138451 A1 | 5/2015 | Amitai | |
| 2015/0198805 A1 | 7/2015 | Mansharof et al. | |
| 2015/0205140 A1 | 7/2015 | Mansharof et al. | |
| 2015/0205141 A1 | 7/2015 | Mansharof et al. | |
| 2015/0233824 A1 | 8/2015 | Richards et al. | |
| 2015/0277127 A1 | 10/2015 | Amitai | |
| 2015/0293360 A1 | 10/2015 | Amitai | |
| 2015/0355481 A1 | 12/2015 | Hilkes et al. | |
| 2016/0012643 A1 | 1/2016 | Kezele et al. | |
| 2016/0018639 A1 | 1/2016 | Spitzer et al. | |
| 2016/0018654 A1 | 1/2016 | Haddick et al. | |
| 2016/0020965 A1 | 1/2016 | Sakata et al. | |
| 2016/0041384 A1* | 2/2016 | Robbins .................. | G06F 3/013 359/630 |
| 2016/0062119 A1 | 3/2016 | Fitch et al. | |
| 2016/0085300 A1* | 3/2016 | Robbins ............... | H04N 23/673 345/633 |
| 2016/0116743 A1 | 4/2016 | Amitai | |
| 2016/0125642 A1 | 5/2016 | Zhu et al. | |
| 2016/0170212 A1 | 6/2016 | Amitai | |
| 2016/0170213 A1 | 6/2016 | Amitai | |
| 2016/0170214 A1 | 6/2016 | Amitai | |
| 2016/0187656 A1 | 6/2016 | Amitai | |
| 2016/0247319 A1 | 8/2016 | Nowatzyk et al. | |
| 2016/0278695 A1 | 9/2016 | Wang et al. | |
| 2016/0282616 A1 | 9/2016 | Matsushita | |
| 2016/0314564 A1 | 10/2016 | Jones | |
| 2016/0341964 A1 | 11/2016 | Amitai | |
| 2016/0349518 A1 | 12/2016 | Amitai et al. | |
| 2017/0003504 A1 | 1/2017 | Vallius | |
| 2017/0007351 A1 | 1/2017 | Yu | |
| 2017/0045744 A1 | 2/2017 | Amitai | |
| 2017/0052376 A1 | 2/2017 | Amitai | |
| 2017/0052377 A1 | 2/2017 | Amitai | |
| 2017/0122725 A1 | 5/2017 | Yeoh | |
| 2017/0130224 A1 | 5/2017 | Oestergaard et al. | |
| 2017/0132757 A1 | 5/2017 | Thiebaud et al. | |
| 2017/0146802 A1 | 5/2017 | Pletenetskyy | |
| 2017/0169747 A1 | 6/2017 | Richards et al. | |
| 2017/0205277 A1 | 7/2017 | Ohtsuki | |
| 2017/0248790 A1 | 8/2017 | Cheng | |
| 2017/0307896 A1 | 10/2017 | Kovaluk et al. | |
| 2017/0336636 A1 | 11/2017 | Amitai et al. | |
| 2017/0353714 A1 | 12/2017 | Poulad et al. | |
| 2017/0357095 A1 | 12/2017 | Amitai | |
| 2017/0363799 A1 | 12/2017 | Ofir et al. | |
| 2018/0039082 A1 | 2/2018 | Amitai | |
| 2018/0067315 A1* | 3/2018 | Amitai ................ | G02B 6/0035 |
| 2018/0130391 A1 | 5/2018 | Bohn | |
| 2018/0157057 A1 | 6/2018 | Gelberg et al. | |
| 2018/0210202 A1 | 7/2018 | Danziger | |
| 2018/0267317 A1 | 9/2018 | Amitai | |
| 2018/0275384 A1 | 9/2018 | Danziger et al. | |
| 2018/0275409 A1 | 9/2018 | Gao et al. | |
| 2018/0292592 A1 | 10/2018 | Danziger | |
| 2018/0292599 A1 | 10/2018 | Ofir et al. | |
| 2018/0373039 A1 | 12/2018 | Amitai | |
| 2019/0011710 A1 | 1/2019 | Amitai | |
| 2019/0037712 A1 | 1/2019 | Kim et al. | |

(56) References Cited

U.S. PATENT DOCUMENTS

| | | |
|---|---|---|
| 2019/0037718 A1 | 1/2019 | Shapiro et al. |
| 2019/0056600 A1* | 2/2019 | Danziger ............... A61B 3/12 |
| 2019/0064518 A1 | 2/2019 | Danziger |
| 2019/0068944 A1 | 2/2019 | Zhang et al. |
| 2019/0086674 A1* | 3/2019 | Sinay ................. G02B 27/0172 |
| 2019/0155035 A1 | 5/2019 | Amitai |
| 2019/0159354 A1 | 5/2019 | Zheng |
| 2019/0170327 A1 | 6/2019 | Eisenfeld et al. |
| 2019/0187482 A1 | 6/2019 | Lanman |
| 2019/0208187 A1 | 7/2019 | Danziger |
| 2019/0212487 A1 | 7/2019 | Danziger et al. |
| 2019/0222830 A1 | 7/2019 | Edwin et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0027855 A1 | 1/2020 | Lee et al. |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0241308 A1* | 7/2020 | Danziger ............ G02B 27/0093 |
| 2020/0249481 A1 | 8/2020 | Danziger et al. |
| 2020/0261279 A1 | 8/2020 | Weidman et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292818 A1* | 9/2020 | Amitai ................ G02B 27/0172 |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0165231 A1 | 6/2021 | Gelberg et al. |
| 2021/0239898 A1 | 8/2021 | Danziger et al. |
| 2022/0018760 A1 | 1/2022 | Spartz et al. |
| 2022/0035758 A1 | 2/2022 | Hanna et al. |
| 2022/0108458 A1* | 4/2022 | Vostrikov ............. G06V 40/193 |
| 2022/0179221 A1* | 6/2022 | Amitai ................ G02B 27/283 |
| 2022/0334399 A1* | 10/2022 | Ronen ................. G02B 6/4298 |

FOREIGN PATENT DOCUMENTS

| | | |
|---|---|---|
| CN | 106054392 | 10/2016 |
| CN | 207216158 U | 4/2018 |
| CN | 207424391 U | 5/2018 |
| JP | H09101479 A | 4/1997 |
| JP | 2001021448 | 1/2001 |
| JP | 2006145644 A | 6/2006 |
| JP | 2008035146 | 2/2008 |
| JP | 2008134471 | 6/2008 |
| JP | 2013231652 | 11/2013 |
| JP | 2017135605 A | 8/2017 |
| WO | 2007/037089 | 4/2007 |
| WO | WO/2022/107140 | 5/2022 |

OTHER PUBLICATIONS

Mukawa H "A full-color eyewear display using planar waveguides with reflection volume holograms", Article in Information Display • Mar. 2009 DOI: 10.1002/j.2637-496X.2009.tb00066.x.

Wei Chen et al; "An Image Quality Evaluation Method of Near-eye Display" in 1060 • SID Symposium Digest of Technical Papers, vol. 47, No. 1, May 1, 2016, pp. 1060-1063, XP 0554411041,US.

* cited by examiner

OPTICAL SYSTEMS AND METHODS FOR EYE TRACKING BASED ON EYE IMAGING VIA COLLIMATING ELEMENT AND LIGHT-GUIDE OPTICAL ELEMENT

CROSS-REFERENCE TO RELATED APPLICATIONS

This application claims priority from U.S. Provisional Patent Application No. 63/126,551, filed Dec. 17, 2020, whose disclosure is incorporated by reference in its entirety herein.

TECHNICAL FIELD

The present invention relates to eye tracking.

BACKGROUND OF THE INVENTION

Optical arrangements for near eye display (NED), head mounted display (HMD) and head up display (HUD) require large aperture to cover the two-dimensional area where the observer's eye is located (commonly referred to as the eye motion box—or EMB). In order to implement a compact device, the image that is to be projected into the observer's eye is generated by a small optical image generator (projector) having a small aperture that is multiplied to generate a large aperture.

An approach to aperture multiplication in one dimension has been developed based on a parallel-faced slab of transparent material within which the image propagates by internal reflection. Part of the image wavefront is coupled out of the slab, either by use of obliquely angled partial reflectors or by use of a diffractive optical element on one surface of the slab. Such a slab is referred herein as a light-guide optical element (LOE), light transmitting substrate, or optical waveguide. The principles of such aperture multiplication are illustrated schematically in FIG. 1, which shows a light-guide optical element 20 having a pair of parallel faces 26, 26A for guiding light by internal reflection. A projected image 18, as represented here schematically by a beam of illumination 18 including sample rays 18A and 18B which span the beam, is coupled into the light-guide optical element 20, as illustrated here schematically by a first reflecting surface 16, so as to generate reflected rays 28 which are trapped by internal reflection within the substrate, generating also rays 30. The image propagates along the substrate by repeated internal reflection, impinging on a sequence of partially reflective surfaces 22 at an oblique angle ($\alpha_{sur}$) to the parallel faces 26, 26A, where part of the image intensity is reflected so as to be coupled out of the substrate as rays 32A, 32B toward the eye 24 of an observer. In order to minimize unwanted reflections which might give rise to ghost images, the partially reflective surfaces 22 are preferably coated so as to have low reflectance for a first range of incident angles, while having the desired partial reflectivity for a second range of incident angles, where a ray with a small inclination to the normal to a partially reflective surface 22 (represented here as angle $\beta_{ref}$) is split in order to generate a reflected ray for coupling out, while a high inclination (to the normal) ray is transmitted with negligible reflection.

The projected image 18 is a collimated image, i.e., where each pixel is represented by a beam of parallel rays at a corresponding angle, equivalent to light from a scene far from the observer (the collimated image is referred to as being "collimated to infinity"). The image is represented here simplistically by rays corresponding to a single point in the image, typically a centroid of the image, but in fact includes a range of angles to each side of this central beam, which are coupled into the substrate with a corresponding range of angles, and similarly coupled out at corresponding angles, thereby creating a field of view corresponding to parts of the image arriving in different directions to the eye 24 of the observer.

An optical function which could be useful for NED, HMD or HUD designs is eye tracking, or sensing the direction the eye of the observer is looking relative to the direction of the head (commonly referred to as the gaze direction). Past eye tracking approaches relied on imaging the EMB via one or more off-axis cameras looking from the side toward the EMB. In order to reduce user discomfort, the cameras should be of relatively small size, which can limit the EMB imaging performance. The small camera size, together with the general difficulty of deriving the gaze direction from EMB images sampled at high off-axis angles, results in relatively low performance of such eye tracking approaches.

SUMMARY OF THE INVENTION

Aspects of the present invention provide an eye tracker and corresponding method for tracking the gaze direction of a human eye based on imaging the eye via a light-guide optical element, and are particularly suitable for integrating as part of a NED, HMD or HUD, in particular when used as part of an augmented reality (AR) or virtual reality (VR) system.

According to the teachings of an embodiment of the present invention, there is provided an optical system. The optical system comprises: a light-transmitting substrate having at least two major surfaces deployed with a first of the major surfaces in facing relation to an eye of a viewer for guiding light by internal reflection between the two major surfaces of the light-transmitting substrate; an optical coupling-out configuration associated with the light-transmitting substrate for coupling image light corresponding to a collimated image, guided by internal reflection between the two major surfaces, out of the light-transmitting substrate; a first optical coupling configuration associated with the light-transmitting substrate configured to: collimate light from the eye to produce collimated light, and couple the collimated light into the light-transmitting substrate so as to propagate within the light-transmitting substrate by internal reflection; a second optical coupling configuration associated with the light-transmitting substrate configured to couple the collimated light out of the light-transmitting substrate as coupled-out light; an optical sensor deployed for sensing the coupled-out light; and at least one processor in communication with the optical sensor and configured to process signals from the optical sensor to derive a current gaze direction of the eye.

Optionally, the optical coupling-out configuration includes a plurality of partially reflective surface deployed within the light-transmitting substrate obliquely to the two major surfaces of the light-transmitting substrate.

Optionally, the optical coupling-out configuration includes a diffractive element associated with one of the two major surfaces of the light-transmitting substrate.

Optionally, the light from the eye is in a first optical spectrum, and the image light is in a second optical spectrum.

Optionally, the optical system further comprises: an image projector for generating the collimated image.

Optionally, the second optical coupling configuration is further configured to couple the image light corresponding to the collimated image into the light-transmitting substrate so as to propagate within the light-transmitting substrate by internal reflection.

Optionally, the optical system further comprises: a selectively reflective surface that transmits or reflects the image light corresponding to the collimated image toward the second optical coupling configuration, and reflects or transmits the coupled-out light from the second optical coupling configuration toward the optical sensor.

Optionally, the optical system further comprises: an optical coupling-in configuration associated with the light-transmitting substrate for coupling the image light corresponding to the collimated image into the light-transmitting substrate so as to propagate within the light-transmitting substrate by internal reflection.

Optionally, the optical coupling-in configuration reflects the image light corresponding to the collimated image, and transmits the collimated light propagating within the light-transmitting substrate toward the second optical coupling configuration.

Optionally, the image light corresponding to the collimated image that is coupled into the light-transmitting substrate by the optical coupling-in configuration so as to propagate within the light-transmitting substrate by internal reflection reaches the second optical coupling configuration, and the second optical coupling configuration transmits the image light corresponding to the collimated image propagating within the light-transmitting substrate.

Optionally, the optical system further comprises: optics deployed in an optical path from the second optical coupling configuration to the optical sensor for forming at least one image of at least a portion of the eye on the optical sensor.

Optionally, the optical system further comprises: an image projector that includes a spatial light modulator for producing image light, and the optics form part of the image projector and collimate the image light produced by the spatial light modulator so as to generate the collimated image.

Optionally, the first optical coupling configuration reflects light from the eye and transmits the image light corresponding to the collimated image.

Optionally, the first optical coupling configuration includes a curved surface having a curvature sufficient to collimate the light from the eye to infinity.

Optionally, the curvature is a function of a distance between the eye and the first of the major surfaces of the light-transmitting substrate.

Optionally, the first optical coupling configuration is deployed within the light-transmitting substrate obliquely to the two major surfaces of the light-transmitting substrate.

Optionally, the optical system further comprises: a second light-transmitting substrate having at least two major surfaces, one of the two major surfaces of the second light-transmitting substrate is associated with one of the two major surfaces of the light-transmitting substrate, and at least one optical element of the first optical coupling configuration is deployed within the second light-transmitting substrate.

Optionally, the at least one optical element of the first optical coupling configuration is deployed in a region of the second light-transmitting substrate that is located in front of the eye such that a normal to the at least one optical element of the first optical coupling configuration reaches approximately the center of the pupil of the eye.

Optionally, the two major surfaces of the light-transmitting substrate are parallel to each other, and the two major surfaces of the second light-transmitting substrate are parallel to each other and are parallel to the two major surfaces of the light transmitting substrate.

Optionally, at least one of the major surfaces of the second light-transmitting substrate is a curved surface.

Optionally, the second light-transmitting substrate is formed as a lens for applying optical power to light from a real-world scene.

Optionally, the optical system further comprises: a second light-transmitting substrate having at least two major surfaces including a first major surface and a second major surface, the first major surface of the second light-transmitting substrate is associated with the second major surface of the light-transmitting substrate, and the first optical coupling configuration includes: at least one collimating element deployed within the second light-transmitting substrate, and a partial reflector deployed within the light-transmitting substrate obliquely to the two major surfaces of the light-transmitting substrate, the partial reflector: transmitting light from the eye toward the at least one collimating element such that the at least one collimating element produces collimated light from the light from the eye, and reflecting the collimated light, produced by the at least one collimating element, so as to couple the collimated light into the light-transmitting substrate so as to propagate within the light-transmitting substrate by internal reflection.

Optionally, the optical system further comprises: a second light-transmitting substrate having at least two major surfaces including a first major surface and a second major surface, the second major surface of the second light-transmitting substrate is associated with the first major surface of the light-transmitting substrate, and the first optical coupling configuration includes: at least one collimating element deployed within the second light-transmitting substrate for collimating light from the eye to produce collimated light, a first reflector deployed within the second light-transmitting substrate obliquely to the two major surfaces of the light-transmitting substrate, the first reflector deflecting the collimated light out of the second light-transmitting substrate and into the light-transmitting substrate, and a second reflector deployed within the light-transmitting substrate obliquely to the two major surfaces of the light-transmitting substrate, the second reflector deflecting light from the first reflector so as to couple the collimated light into the light-transmitting substrate so as to propagate within the light-transmitting substrate by internal reflection.

Optionally, the optical system further comprises: an illumination arrangement deployed to illuminate the eye with illumination light such that the eye reflects the illumination light as reflected light, the reflected light corresponds to the light from the eye that is collimated by the first optical coupling configuration.

Optionally, the second optical coupling configuration includes a reflecting surface that deflects the collimated light out of the light-transmitting substrate.

Optionally, the second coupling configuration includes a planar open end of the light-transmitting substrate, the open end is formed by cutting the light-transmitting substrate along a plane that is orthogonal to the two major surfaces of the light-transmitting substrate.

Optionally, the at least one processor is configured to receive the signals from the optical sensor over one or more communication networks.

There is also provided according to an embodiment of the teachings of the present invention an optical system. The optical system comprises: a light-guide optical element (LOE) having at least two major surfaces deployed with a first of the major surfaces in facing relation to an eye of a viewer for guiding light by internal reflection between the two major surfaces of the LOE; a plurality of partially reflective surface deployed within the LOE obliquely to the two major surfaces of the LOE for coupling image light corresponding to a collimated image, guided by internal reflection between the two major surfaces, out of the LOE; an optical element deployed within the LOE, the optical element being selectively reflective and selectively applying optical power to incident light such that the optical element: collimates light reflected from the eye to produce collimated light, and reflects the collimated light so as to couple the collimated light into the LOE for guiding by internal reflection between the two major surfaces, and transmits and applies substantially no optical power to the image light corresponding to the collimated image that is guided by internal reflection between the two major surfaces; an imaging system; and an optical coupling configuration associated with the LOE configured to couple the collimated light out of the LOE to the imaging system, the imaging system forms an image of the eye from the collimated light that is coupled out of the LOE by the optical coupling configuration.

Optionally, the imaging system includes an optical sensor for sensing the collimated light that is coupled out of the LOE by the optical coupling configuration, and the optical system further comprises: a processing system in communication with the optical sensor and configured to process signals from the optical sensor to derive a current gaze direction of the eye.

There is also provided according to an embodiment of the teachings of the present invention an optical system. The optical system comprises: a light-transmitting substrate having at least two major surfaces deployed with a first of the major surfaces in facing relation to an eye of a viewer for guiding light by internal reflection between the two major surfaces of the light-transmitting substrate; a first optical coupling configuration associated with the light-transmitting substrate operative to: collimate reflected light from the eye to produce collimated light, and couple the collimated light into the light-transmitting substrate so as to propagate within the light-transmitting substrate by internal reflection; a second optical coupling configuration associated with the light-transmitting substrate configured to couple the collimated light out of the light-transmitting substrate as coupled-out light; focusing optics associated with the second optical coupling configuration and operative to convert the coupled-out light into converging beams of captured light; an optical sensor deployed for sensing the captured light; and at least one processor in communication with the optical sensor and configured to process signals from the optical sensor to derive a current gaze direction of the eye.

Within the context of this document, the term "guided" generally refers to light that is trapped within a light-transmitting material (e.g., a substrate) by internal reflection at major external surfaces of the light-transmitting material, such that the light that is trapped within the light-transmitting material propagates in a propagation direction through the light-transmitting material. Light propagating within the light-transmitting substrate is trapped by internal reflection when the propagating light is incident to major external surfaces of the light-transmitting material at angles of incidence that are within a given angular range. The internal reflection of the trapped light may be in the form of total internal reflection, whereby propagating light that is incident to major external surfaces of the light-transmitting material at angles greater than a critical angle (defined in part by the refractive index of the light-transmitting material and the refractive index of the medium in which the light-transmitting is deployed, e.g., air) undergoes internal reflection at the major external surfaces. Alternatively, the internal reflection of the trapped light may be effectuated by a coating, such as an angularly selective reflective coating, applied to the major external surfaces of the light-transmitting material to achieve reflection of light that is incident to the major external surfaces within the given angular range.

The eye tracker according to the various embodiments of the present invention relies on collimation and deflection, by an optical coupling configuration, of light reflected from the eye toward an optical sensor. The light that is reflected from the eye is also referred to herein as eye-tracking light. This eye-tracking light is within a particular optical spectrum, also referred to herein as being within the "eye-tracking spectrum". The eye tracker according to the various embodiments of the present invention is particularly effective when the eye-tracking spectrum is in the near infrared (NIR) region of the electromagnetic spectrum (i.e., when the eye-tracking spectrum is within the NIR region). Within the context of this document, light in the NIR region of the electromagnetic spectrum generally refers to light having wavelengths in the range of 700-1400 nanometers (nm), and in certain instances 680-1400 nm. The wavelengths in the vicinity of 700 nm, i.e., in the range of 680-750 nm, may encroach on darker red visible light, but may be of particular advantage when used to illuminate the eye for eye tracking purposes. In the context of the present document, light that is described as primarily having wavelengths in the NIR region generally refers to light having wavelengths in the range of 700-1400 nm or 680-1400 nm unless explicitly stated otherwise. In the context of this document, light that is described as having wavelengths outside of the NIR region generally refers to light having wavelengths less than 700 nm (or less than 680 nm) or greater than 1400 nm unless explicitly stated otherwise.

Although the eye tracker according to the various embodiments of the present invention is particularly effective when the eye-tracking spectrum is in the NIR region, the eye tracker may also be effective when the eye-tracking light is outside the NIR region (as will be discussed), including, for example, the infrared (IR) region, ultra-violet (UV) region, and in certain situations the visible region of the electromagnetic spectrum (i.e., when the eye-tracking spectrum is within the visible light region).

Within the context of this document, light in the visible region of the electromagnetic spectrum, generally refers to light having wavelength in the range of 380-750 nm. Accordingly, there may be some overlap between the NIR region and the visible light region. In the context of this document, light that is described as primarily having wavelengths in the visible light region generally refers to light having wavelengths in the range of 380-700 nm or 380-680 nm unless explicitly stated otherwise. In the context of this document, light that is described as primarily having wavelengths outside of the visible light region generally refers to light having wavelengths less than 380 nm or greater than 700 nm (or greater than 680 nm) unless explicitly stated otherwise. The visible region is referred to interchangeably herein as the "visible light region", "photopic region", and "photopic spectrum".

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
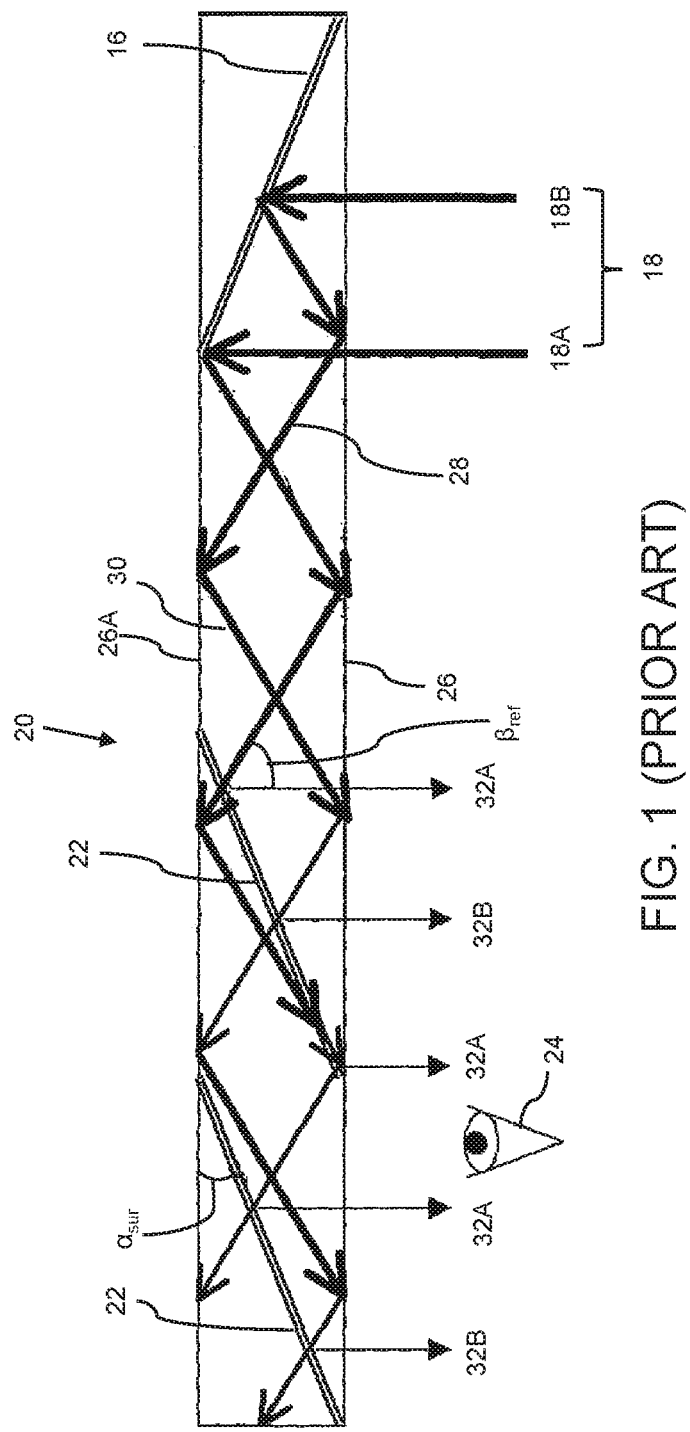
FIG. 1 is a schematic side view, described above, of a prior art light-guide optical element employing partially-reflective surfaces, for use in a near-eye display.

Embodiments of the present invention provide optical systems and corresponding methods for tracking the gaze direction of a human eye based on imaging the eye via a light-guide optical element.

The principles and operation of the optical systems and methods according to present invention may be better understood with reference to the drawings accompanying the description.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

By way of introduction, in many applications, particularly in the context of head-up or near-eye displays, it is useful to provide an eye tracking arrangement for determining the gaze direction of the user. One common approach for performing eye tracking is to sample an image of the eye, typically for the purpose of determining the pupil position within the image, and thereby deriving the orientation of the eye. It would be particularly advantageous to employ a light-guide optical element operating on principles similar to those of FIG. 1 to sample images for eye tracking.

Eye tracking solutions employing a light-guide optical element operating on such principles or similar such principles are described herein. According to certain aspects of the present invention, the eye is imaged by way of an optical coupling configuration (a "first optical coupling configuration") that couples light, reflected from the eye, into the light-guide optical element. Since the eye is not located at infinity from the light-guide optical element (but rather at an eye relief distance, typically on the order of approximately 20 millimeters), the first optical coupling configuration also collimates the light reflected from the eye, such that the eye-tracking light coupled into the light-guide optical element by the first optical coupling configuration is also collimated. This collimated light propagates along a reverse path through the light-guide optical element, in a propagation direction generally opposite that of any image light (from an image projector) that propagates through the light-guide optical element. The collimated light from the eye is then coupled out of the light-guide optical element by another optical coupling configuration (a "second optical coupling configuration"), and is focused by focusing optics onto an optical sensor. Signals produced by the optical sensor, in response to sensing the coupled-out light, are processed by a processing system to derive the gaze direction.

Referring now collectively to FIGS. 2A-8, there is illustrated various aspects of the structure and operation of an optical system, generally designated 100, constructed and operative according to various embodiments of the present invention, for deriving a gaze direction of a human eye 110. Generally speaking, the optical system 100 includes a light-transmitting substrate (referred to interchangeably as a light-guide optical element, or LOE) 102, and an apparatus associated with the LOE 102 for deriving a gaze direction of the eye 110. The apparatus includes an optical coupling configuration 120 (referred to interchangeably as "first optical coupling configuration" and "collimator-coupler") associated with the LOE 102 for collimating and coupling light from the eye 110 into the LOE 102 so as to be guided by the LOE 102, a second optical coupling configuration 136 for coupling the LOE-guided light from the eye out of the LOE 102 toward an optical sensor 152, and a processing system 154 that is electrically associated with the optical sensor 152 and is configured to process signals from the optical sensor 152 to derive a current gaze direction of the eye 110.

The LOE 102 is generally similar to the LOE illustrated in FIG. 1. In particular, the LOE 102 is formed from transparent material (such as glass) and has at least one pair of parallel faces (planar major surfaces) 104, 106 for guiding light by internal reflection. In certain embodiments, the propagation (guiding) by internal reflection is in the form of total internal reflection (i.e., the internal reflection is governed by critical angle, as discussed above), whereas in other embodiments the propagation by internal reflection is effectuated by a coating (e.g., an angularly selectively reflective coating) applied to the surfaces 104, 106. The LOE 102 is deployed with one of the parallel faces 104 in facing relation to the eye 110, where the eye 110 is located in the EMB 114 at an eye relief (ER) distance 116 from the surface 104.

The collimator-coupler 120 is operative to collimate incident illumination (light) coming from the eye 110 (or EMB 114), which is typically generated in response to illumination of the eye 110 (EMB 114) by an illumination arrangement 214, so as to generate collimated light. In addition to collimating incident light to produce collimated light, the collimator-coupler 120 is operative to deflect the incident light so as to couple the resultant collimated light into the LOE 102 such that the collimated light is trapped by internal reflection within the LOE 102. The trapped collimated light propagates within/through (i.e., is guided by) the LOE 102 by internal reflection between (i.e., at) the surfaces 104, 106 until reaching the second optical coupling configuration 136, which couples the collimated light out of the LOE 102 as coupled-out light.

Focusing optics 144 (referred to interchangeably as "lens"), represented schematically as a lens but which may include a set of lenses, is associated with the LOE 102 (at a portion of the surface 104) and is deployed in an optical path between the collimator-coupler 120 and the optical sensor 152. The focusing optics 144 receives the coupled-out light and converts the coupled-out light (sets of parallel light rays) into one or more sets of converging beams of captured light, which impinge on the optical sensor 152. In certain preferred embodiments, the focusing optics 144 is an imaging optic(s) which forms an image of at least a portion of the eye 110 on the optical sensor 152.

Preferably, the focusing optics 144 is integrated into an optical imaging module (or imaging system/camera system) 145 together with the optical sensor 152 which is configured for sensing the captured light and forming an image of portions of the eye from which the illumination emanates. The imaging module 145 is focused to infinity, and the converging beams of captured light are focused (by the lens 144) onto distinct points/regions of the optical sensor 152.

Figure 2A:
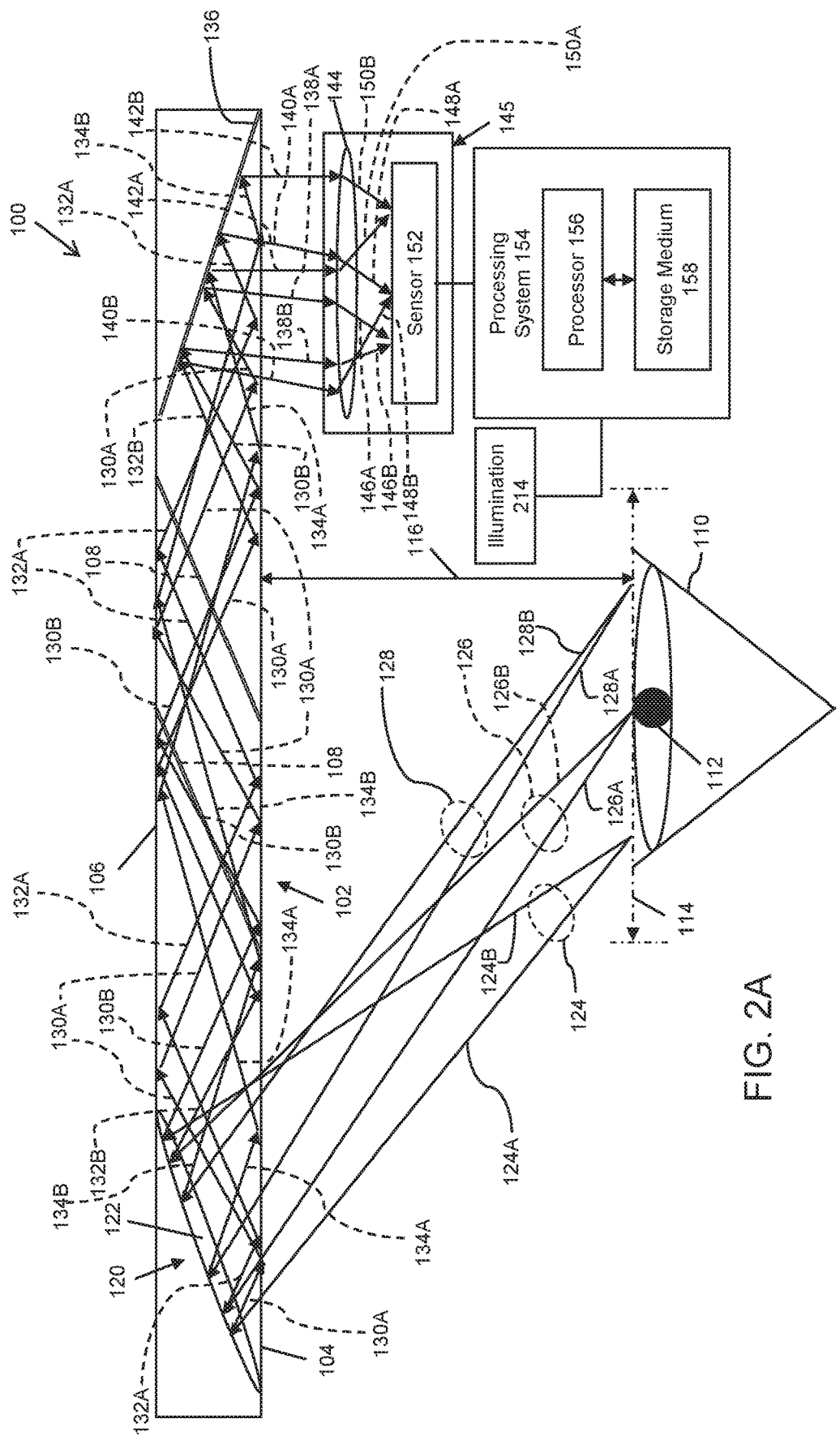
FIG. 2A is a schematic side view of an optical system, constructed and operative according to an embodiment of the present invention, for displaying an image and for tracking the gaze direction of a human eye, that has a first optical coupling configuration for collimating and coupling light from the eye into a light-transmitting substrate, and has a second optical coupling configuration for coupling the light from the eye out of the light-transmitting substrate to an optical sensor via optics, and showing the propagation of light from the eye through a light-transmitting substrate.
Figure 2B:
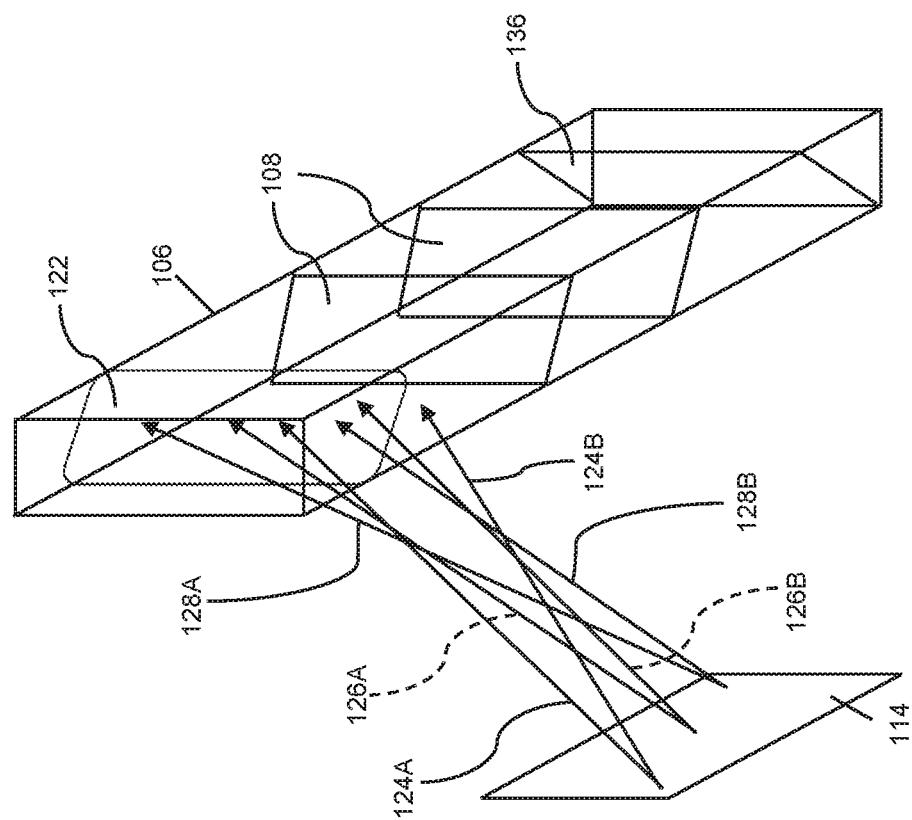
FIG. 2B is a schematic isometric view corresponding to FIG. 2B.
Figure 3:
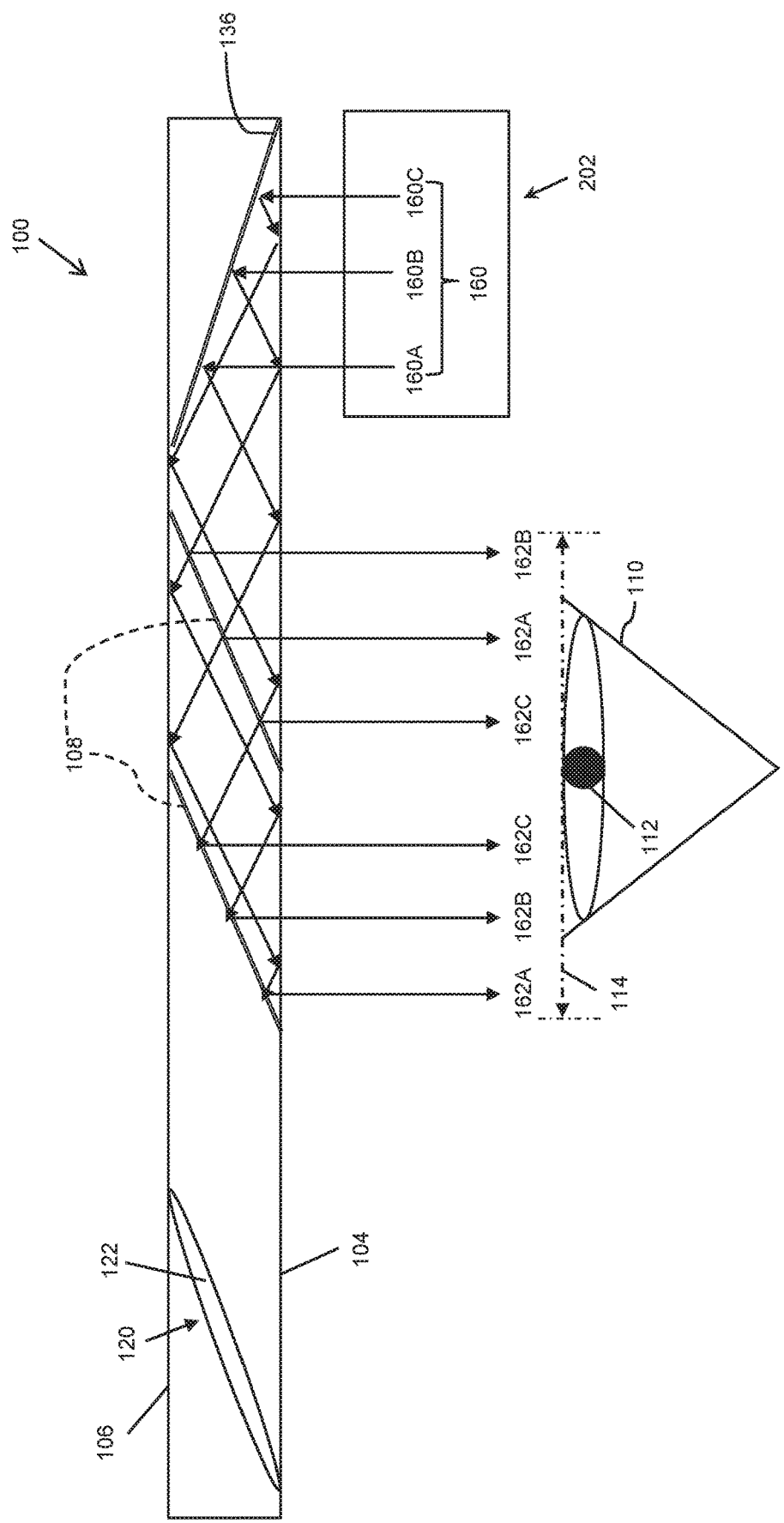
FIG. 3 is a schematic side view of the optical system of FIGS. 2A and 2B, showing propagation of image light, that is generated by an image projector, through the light-transmitting substrate.

With particular reference to FIGS. 2A-3, there is illustrated the LOE 102 with the optical coupling configuration 120 according to a non-limiting embodiment of the present invention. In the illustrated embodiment, the optical coupling configuration 120 is deployed within the LOE 102 obliquely to the surfaces 104, 106 and in a region of the LOE 102 at or near the distal end of the LOE 102. The distal end is opposite a proximal end of the LOE 102 at or near which the second optical coupling configuration 136 is located.

FIG. 2A shows the traversal of light rays from the eye 110 to the optical sensor 152 via the LOE 102. In general, light propagating within the LOE 102 from the eye 110 to the optical sensor 152 is referred to as propagating within the LOE 102 in a reverse propagation direction (referred to interchangeably as a first/second propagation direction, first/second direction, or reverse direction), whereas image light (shown in FIG. 3 as beam 160, which is generated by an image projector 202) propagating within the LOE 102 to the eye 110 is referred to as propagating within the LOE 102 in a forward propagation direction (referred to interchangeably as a second/first propagation direction, second/first direction, or forward direction) that is generally opposite the reverse propagation direction.

The reflected light emanating from the eye 110 (in response to illumination by the illumination arrangement 214) is schematically represented in the drawings by beams of illumination 124, 126, 128, where each of the beams 124, 126, 128 originates from a different respective region/portion of the eye 110. The beam 124 includes sample rays 124A and 124B which span the beam 124. Similarly, beam 126 includes sample rays 126A and 126B which span the beam 126, and the beam 128 includes sample rays 128A and 128B which span the beam 128. It is noted that although each beam is illustrated as including two sample rays for simplicity of presentation, each beam typically includes a multitude or continuum of rays that span the beam.

Each of the beams 124, 126, 128 has an angular distribution spanning two dimensions, in other words each of the beams spans an angular range in the lateral dimension (along the horizontal axis in FIG. 2A), and spans an angular range in the vertical dimension (along the axis normal to the plane of the paper in FIG. 2A). In addition, the different regions/portions of the eye 110 from which the light 124, 126, 128 originates can include different regions in both the lateral dimension and the vertical dimension. The different regions in the horizontal dimension can be seen in FIG. 2A, whereas the different regions in the vertical dimension can be seen in the isometric view of the optical system illustrated FIG. 2B. With respect to FIG. 2B, it is noted that the traversal of light through the LOE 102 is not illustrated for simplicity of presentation.

With continued reference to FIG. 2A, the light 124, 126, 128 from the eye 110 enters the LOE 102 via the surface 104 and reaches the collimator-coupler 120. Depending on the angle of incidence of the incoming light 124, 126, 128 to the surface 104, some of the rays of one or more of the beams 124, 126, 128 may undergo refraction at the surface 104 before reaching the collimator-coupler 120. The light 124, 126, 128 is collimated by the collimator-coupler 120 to produce one or more sets of collimated beams. In particular, the collimator-coupler 120 collimates the light 124 to produce a collimated beam, represented schematically in the drawings by rays 130A and 130B which span the beam. The collimator-coupler 120 also collimates the light 126 to produce a collimated beam, represented schematically in the drawings by rays 132A and 132B which span the beam, and the collimator-coupler 120 collimates the light 128 to produce a collimated beam, represented schematically in the drawings by rays 134A and 134B which span the beam. In addition to collimating the incident light, the collimator-coupler 120 also deflects light so as to couple the collimated light 130A, 130B, 132A, 132B, 134A, 134B into the LOE 102 such that the collimated light is trapped by internal reflection within the LOE 102, generating reflected rays (up-going rays) and generating also down-going rays.

The collimated light 130A, 130B, 132A, 132B, 134A, 134B propagates along (i.e., is guided by/through) the substrate (LOE 102) by internal reflection until it reaches the second optical coupling configuration 136 (schematically represented in the drawings as a reflecting surface, but which may also be implemented as a coupling prism or other coupling optical arrangement), which deflects (couples) the beams (light 130A, 130B, 132A, 132B, 134A, 134B) out of the LOE 102 as coupled-out light, represented schematically in the drawings by coupled-out rays 138A, 138B, 140A, 140B, 142A, 142B. Here, the rays 138A, 138B span a coupled-out beam that corresponds to the input beam 124, the rays 140A, 140B span a coupled-out beam that corresponds to the input beam 126, and the rays 142A, 142B span a coupled-out beam that corresponds to the input beam 128. Note that depending on the angle of incidence of the coupled-out light 138A, 138B, 140A, 140B, 142A, 142B to the surface 104, some of the rays that are deflected by the second optical coupling configuration 136 may undergo refraction at the surface 104 upon exiting the LOE 102.

The lens 144 converts each beam of collimated coupled-out light (i.e., the beam spanned by 138A, 138B, the beam spanned by 140A, 140B, and the beam spanned by 142A, 142B) into a set of converging beams of captured light that reach the optical sensor 152, such that each beam of collimated coupled-out light is focused by the lens 144 onto a different respective portion of the optical sensor 152. Three example converging beams of captured light are illustrated in the drawings, where each of the converging beams of captured light corresponds to a different one of the three input beams 124, 126, 128. A first one of the converging beams of captured light is represented schematically in the drawings by sample rays 146A and 146B, which are focused by the lens 144 onto a first region of the optical sensor 152. The sample rays 146A and 146B correspond to rays 138A and 138B, respectively, of the coupled-out beam that corresponds to the input beam 124. Another one of the converging beams of captured light is represented schematically in the drawings by sample rays 148A and 148B, which are focused by the lens 144 onto a second region of the optical sensor 152. The sample rays 148A and 148B correspond to rays 140A and 140B, respectively, of the coupled-out beam that corresponds to the input beam 126. The third of the converging beams of captured light is represented schematically in the drawings by sample rays 150A and 150B, which are focused by the lens 144 onto a third region of the optical sensor 152. The sample rays 150A and 150B correspond to rays 142A and 142B, respectively, of the coupled-out beam that corresponds to the input beam 128.

The optical sensor 152 generates signals in response to sensing the focused light (e.g., corresponding to the image of eye), and those signals are transferred to the processing system 154 which is electrically associated with the optical sensor 152 and is configured to process signals from the optical sensor 152 to derive a current gaze direction of the eye 110.

The optical system according to certain embodiments is also configured for displaying an image to the eye 110 by way of an image projector and optical coupling-out configuration, similar to as described with reference to FIG. 1. Referring now to FIG. 3, this shows the propagation of light within the LOE 102 in the forward direction. A projected image 160, as represented here schematically by a beam of illumination 160 (including sample rays 160A, 160B, and 160C which span the beam) is generated by an image projector 202 associated with one of the surfaces 104 and is coupled into the LOE 102 via an optical coupling configuration, which in the illustrated embodiment is the second optical coupling configuration 136, such that the collimated image 160 is trapped by internal reflection within the LOE 102, generating reflected rays (up-going rays) and generating also down-going rays.

The image 160 propagates along (i.e., is guided by/through) the LOE 102 by repeated internal reflection between the faces 104, 106, impinging on optical coupling-out configuration 108 (shown here as mutually parallel partially reflective surfaces deployed within the LOE 102 obliquely to the surfaces 104, 106) where part (a proportion) of the image intensity is reflected partially reflective surfaces 108 so as to be coupled out of the LOE 102 as rays 162A, 162B, 162C toward the eye 110.

The image light 160 is (i.e., corresponds to) a collimated image, i.e., where each pixel is represented by a beam of parallel rays at a corresponding angle, equivalent to light from a scene far from the observer (the collimated image is referred to as being "collimated to infinity"). The image is represented simplistically in FIG. 3 by rays 160A, 160B, and 160C corresponding to a single point in the image, typically a centroid of the image, but in fact includes a range of angles to each side of this central beam, which are coupled into the LOE 102 with a corresponding range of angles, and similarly coupled out at corresponding angles, thereby creating a field of view corresponding to parts of the image arriving in different directions to the eye 110 of the observer.

Although not illustrated in the FIG. 3, the image projector 202 includes a microdisplay, which is typically a spatial light modulator such as a liquid-crystal on silicon (LCoS) or liquid-crystal display (LCD), but can also be another type of microdisplay such as an organic light-emitting diode (OLED), for generating image light. The image projector 202 also includes corresponding collimating optics (not shown in FIG. 3) for collimating the image to infinity. When the microdisplay is implemented as a spatial light modulator, illumination components (such as one or more LEDs), together with the microdisplay and collimating optics, can be suitable arranged on surfaces of one or more polarization beamsplitter (PBS) cube or other prism arrangement in order to direct light from the illumination components to the microdisplay, and to direct the image light to the collimating optics. It is also noted that although the optical imaging module 145 and the image projector 202 are shown separately in FIGS. 2A-2B and FIG. 3, various configurations of an imaging module operating in cooperation with, and in certain cases integrated together with the image projector 202, are contemplated herein, and examples of such configurations will be described in subsequent sections of the present disclosure with reference to FIGS. 7 and 8.

In certain embodiments, the processing system 154 is also electrically associated with the image projector 202 so as to provide image generation control functionality. In addition, the processing system 154 may also be electrically associated with the illumination arrangement 214 so as to control illumination timing of the EMB by the illumination arrangement 214. The following paragraphs describe the structure and operation of the illumination arrangement 214, as well as the structure and operation of the processing system 154 for deriving gaze direction based on the light sensed by the optical sensor 152.

The illumination arrangement 214 includes at least one light source, and preferably includes multiple light sources, each configured for illuminating one or more regions of the EMB 114 with light in the eye-tracking spectrum, such that a proportion of the intensity of the light from the illumination arrangement 214 incident on the EMB 114/eye 110 is reflected by the eye 110 back toward the LOE 102, and in particular the collimator-coupler 120, as reflected light. The light source (or sources) of the illumination arrangement 214 can be implemented as an LED(s), or any other source that is configured to emit (produce) light in the eye-tracking spectrum. In certain non-limiting implementations, the light sources of the illumination arrangement 214 are isotropic (or near-isotropic) sources that emit light in all directions. Preferably, the illumination arrangement 214 is configured to illuminate the eye 110 with light having wavelengths outside of the photopic region of the electromagnetic spectrum. In other words, the illumination arrangement 214 is preferably configured to illuminate the eye 110 with light that is not visible to the human eye. Reflection from the human eye, and in particular reflection from the retina of the eye, is substantially higher in the near infrared than at visible wavelengths. Accordingly, it is preferable that the illumination arrangement 214 is configured to illuminate the eye 110 with light having wavelengths in the NIR region of the electromagnetic spectrum.

Figure 4:
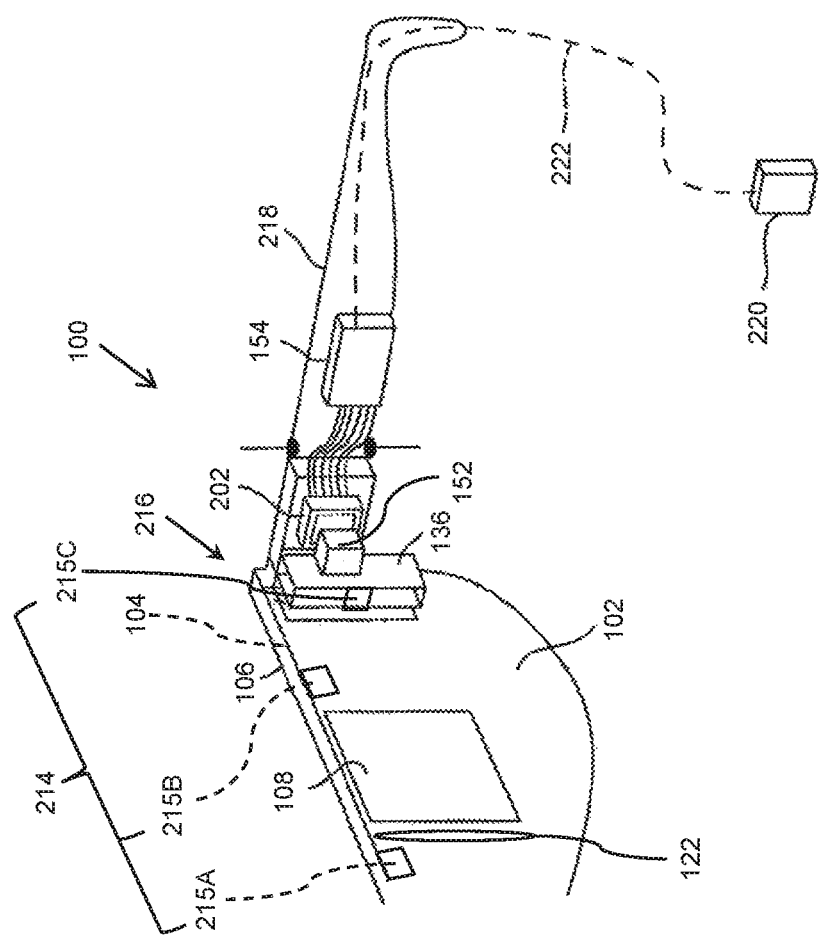
FIG. 4 is a partial schematic isometric view of the optical system of FIGS. 2A-3, implemented in an eye-glasses form factor.

Various deployment configurations of the illumination arrangement 214 can be employed in order to illuminate the eye 110 for eye-tracking purposes. In one non-limiting example deployment configuration of the illumination arrangement 214, the illumination arrangement 214 includes one or more light sources deployed in proximity to the optical sensor 152 and/or about the periphery of a mechanical body of the optical system 100 in which the LOE 102 is mounted. FIG. 4 shows such a non-limiting example configuration in which the optical system 100 is implemented in an eye-glasses form factor with a head-mounted mechanical body implemented as an eye-glasses frame 216 with side arms 218 for engaging the ears of the observer (viewer). The optical system 100 is powered from a suitable electrical power source, which may be any combination of batteries and/or an external power source provided, illustrated here schematically as power source 220 connected via a cable 222. Where battery power is used, the batteries may be integrated as part of the eye-glasses. It should be noted that other form factors, such as helmet-mounted form factors, vehicle windshield form factors, and other head-up display and near-eye display form factors also clearly fall within the scope of the present invention. In the non-limiting configuration illustrated in FIG. 4, the illumination arrangement 214 includes three separate light sources 215A, 215B, 215C (implemented, for example, as three LEDs). Two of the sources 215A, 215B are deployed on a peripheral portion of the eye-glasses frame 216 towards the top portion of the LOE 102, and at or near the partially reflective surfaces 108. The third light source 215C is deployed near the side of the observer's head in proximity to the optical coupling configuration 136.

Parenthetically, it should be noted that other form factors, such as helmet-mounted form factors, vehicle windshield form factors, and other head-up display and near-eye display form factors also clearly fall within the scope of the present invention. Certain embodiments of the present disclosure may be of particular value when deployed as part of a head-up display (HUD) in a vehicle or an aircraft, whereby the display of images projected by the image projector 202 in automotive or aviation environments may be dependent or controlled, at least in part, by the eye gaze direction of the user of the HUD. In an automotive environment, a HUD employing the major components of the optical systems according to the disclosed embodiments may be installed in front of the driver of the vehicle, for example integrated into the dashboard or front windshield of the vehicle. In aviation environments, the HUD may be installed in front of the pilot of the aircraft, for example installed as part of a pilot helmet in a front region of the helmet.

The processing system 154 may be implemented using any suitable type of processing hardware and/or software, as is known in the art, including but not limited to any combination of various dedicated computerized processors operating under any suitable operating system and implementing suitable software or firmware modules. The processing system 154 may further include various communications components for allowing wired or wireless communication with LAN and/or WAN devices for bidirectional transfer of information and graphic content. In the non-limiting example processing system 154 illustrated in FIG. 2A, the processing subsystem 154 includes at least one computerized processor 156 coupled to a storage medium 158. The storage medium 158 can be one or more computerized memory devices, such as volatile data storage. The processor 156 may be implemented as any number of computerized processors including, but not limited to, microprocessors, microcontrollers, graphics processors, display drivers, application-specific integrated circuits (ASICs), digital signal processors (DSPs), image processors, field-programmable gate arrays (FPGAs), field-programmable logic arrays (FPLAs), and the like. Such computerized processors include, or may be in electronic communication with computer readable media, which stores program code or instruction sets that, when executed by the computerized processor, cause the computerized processor to perform actions. Types of computer readable media include, but are not limited to, electronic, optical, magnetic, or other storage or transmission devices capable of providing a computerized processor with computer readable instructions. Although the processing system 154 is illustrated as being deployed locally with the optical sensor 152, and in certain cases integrated in the mechanical body of the optical system 100 (as in FIG. 4), it is noted that the processing system 154 may alternatively be deployed remote from the other major components of the optical system 100. For example, in certain embodiments, the processing system 154 can be implemented as a remote processing server that receives signals representative of the signals produced by the optical sensor 152 in response to sensing captured light. The signals can be transmitted to the remote processing system 154 over one or more wired and/or wireless communication networks using a network interface device connected to the optical sensor 152.

In certain non-limiting embodiments, the optical system 100 obtains the gaze direction (the angular orientation of the eye, or line of sight of the eye) by imaging patterns that exist on specific regions of the eye 110. The position of such patterns and their motion are indicative of the current gaze direction and motion of the eye. The human eye includes various trackable features, including, for example, patterns generated by the nerves of the cornea (i.e., corneal nerve patterns) based on corneal reflections, the center of the eye pupil, and patterns generated by the blood vessels of the optic disc. These trackable features can be tracked using appropriate tracking algorithms implemented by suitable image processing instructions performed by the processing system 154. In certain non-limiting embodiments, the processing system 154 computes the gaze direction based on the vector between the pupil center and the corneal reflections.

In general, all background illumination causes noise that degrades the quality of the eye image. In order to reduce the effects of external illumination sources (e.g., ambient light, natural sunlight, etc.) the illumination arrangement 214 may be configured to generate a short pulse of light (preferably below 1 ms), and the optical sensor 152 is synchronized (by the processing subsystem 154) to integrate light only during this short illumination duration. In this manner, continuous background illumination can be greatly suppressed. Additionally, or alternatively, a passband spectral filter may be deployed in the optical path from the second optical coupling configuration 136 to the optical sensor 152 to obstruct light of wavelengths outside a given range of wavelengths within which the eye-tracking illumination is generated from reaching the optical sensor 152. The spectral filter may ideally be positioned between the focusing optics 144 and the optical sensor 152, but may alternatively be deployed before the focusing optics 144.

In a non-limiting process for deriving and tracking the gaze direction, the cornea pattern (optionally in combination with the optic disc pattern and/or pupil) is mapped and trackable features are determined during an initial setup process, and then a continuous tracking process is performed. For example, an image marker may be displayed to the observer for the observer to look at during an initialization. While the observer looks towards the marker, the illumination arrangement 214 fully illuminates the cornea and a full image of the cornea (and pupil) is obtained (via the optical sensor 152). This image is then processed by processing system 154 to identify trackable features (for example, the optic disc and the fovea). During the continuous tracking process, selected regions of interest (ROI) of the eye 110 are selectively illuminated by the illumination arrangement 214, and an image of the ROI (obtained by the optical sensor 152) is sampled and processed (by the processing system 154) during the corresponding illumination pulse to determine the current gaze direction (line of sight), and this derived gaze direction is used to update the position of the ROI for the subsequent illumination cycle, and the continuous tracking process repeats by illuminating the updated ROI. Assuming that the frequency of the tracking measurements is high compared to the speed of motion of the eye, this update process is typically effective to maintain continuous tracking, optionally combined with tracking information from the other eye. As the gaze direction changes, so does the illumination area. Updating of the ROI may be performed according to the "current" gaze direction as determined from the last sampled image or, in certain cases, may use predictive extrapolation based on eye motion between the previous two or more measurements. In the event that tracking fails, the size of the illuminated region can be temporarily increased until the trackable features are recovered.

The light sources of the illumination arrangement 214 may be configured to emit eye-tracking light at approximately the same or different center wavelengths within the eye-tracking spectrum. Typically, in the NIR region the dispersion of glass materials from which the LOE 102 can be constructed is sufficiently low so to avoid suffering from distortion within the spectral width of a single eye-tracking light source (the spectral width typically being in the range of 20-50 nm for LEDs). However, employing light sources that emit eye-tracking light at two spectrally separated center wavelengths (while still being within the same region of the eye-tracking electromagnetic spectrum), may provide certain advantages when imaging the eye. For example, deploying the illumination arrangement 214 with a first and a second light source that emit light centered around approximately 700 nm and 950 nm, respectively, can result in two different images of the eye, shifted one relative to the other, formed on the optical sensor 152. By applying appropriate image processing algorithms, such as correlation algorithms, the processing subsystem 154 may achieve higher resolution in the gaze direction calculations.

The optical structure and characteristics of the collimator-coupler 120 according to certain embodiments of the present disclosure will now be discussed in more detail. Referring again to the embodiment illustrated in FIGS. 2A-3, the collimator-coupler 120 includes an optical element 122 (represented schematically in FIGS. 2A and 2B by a lens) that performs both collimation and light-deflection for coupling light into the LOE. The collimation and coupling functionality of the optical element 122 is effectuated by an optical surface, which in certain preferred but not limiting implementations is a spherical (or nearly spherical) surface or an aspherical surface. The optical element 122 may be implemented in other ways besides as a spherical or aspherical (curved) surface, including, for example, as a holographic surface, or as a dichroic grating. In order to effectively collimate and couple-in light from the eye 110, the optical element 122 preferably has one or more of the following properties:

1) The optical element 122 preferably exhibits light discriminating properties, for example effectuated by a coating that discriminates between certain types of light, such that the optical element 122 reflects only eye-tracking light and transmits image light generated by the image projector. In certain embodiments, the light discrimination of the optical element 122 is actualized by the optical element 122 being spectrally selective, such that the optical element 122 reflects light having wavelengths in the eye-tracking optical spectrum, and transmits light in the photopic (visible) optical spectrum. As mentioned, the eye-tracking spectrum refers to the optical spectrum that is occupied by the light generated by the illumination arrangement 214, which is preferably the NIR region of the electromagnetic spectrum (but can be other regions of the spectrum as well, including, for example, infrared or ultraviolet, as will be discussed). In other embodiments, the light discrimination of the optical element 122 is actualized by the optical element 122 being polarization selective such that the optical element 122 reflects incident light that is polarized in one polarization direction and transmits incident light that is polarized in a second polarization direction that is orthogonal to the first polarization direction. The polarization selectivity of the optical element 122 will be discussed in further detail below.

2) The optical element 122 is deployed obliquely to the surfaces 104, 106 and preferably is appropriately dimensioned to have an elongated shape (in a direction of elongation normal to the vector defined by the oblique deployment angle) that is of sufficient length so as to collimate and couple-in all light originating from the eye 110 (EMB 114), including beams 124, 128 originating from the edges of the EMB 114. The optical element 122 is also preferably appropriately dimensioned to be narrow enough (measured along the vector defined by the oblique deployment angle) to be encapsulated within the LOE 102 (between surfaces 104, 106).

3) When implemented as a curved (spherical or aspherical) surface, the optical element 122 preferably has a curvature that is optimized (or nearly optimized) to collimate the eye 110 (or EMB 114) to infinity (i.e., image the eye 110 at infinity). The particular curvature value can be calculated as a function of the ER 116 (distance between the surface 104 and the EMB 114).

4) The optical element 122 is preferably such that the optical (collimating) surface of the optical element 122 is deployed between two mediums having the same refractive index, such that the light that propagates through the collimating surface (e.g., spherical surface, aspherical surface) does not undergo a change in optical power.

5) The optical element 122 is deployed obliquely to the surfaces 104, 106. The oblique deployment angle of the optical element 122 may be different from the oblique deployment angle of the partially reflective surfaces 108, but should be selected such that all the light 124, 124, 124 from the eye 110 is deflected at appropriate angles to ensure that the deflected light is coupled into the LOE 102 and trapped by internal reflection. Oblique deployment angles of the optical element 122 in the range of 25°-35° have been found to be suitable for achieving efficient trapping of light. In certain preferred but non-limiting implementations, the optical element 122 is deployed at an angle of approximately 30° measured relative to the surfaces 104, 106.

In addition to employing discrimination so as to selectively reflect and transmit incident light, the optical element 122 is preferably further operative to employ discrimination so as to only collimate certain types of incident light. Specifically, the optical element 122 is preferably configured to only collimate light reflected from the eye (i.e., only applies optical power to light reflected from the eye), but not to collimate (i.e., applies no optical power) to image light generated by the image projector. One particular advantage of a collimator-coupler 120 having an optical element 122 with such properties is that the optical element 122 can be deployed in other regions of the LOE 102, for example in overlapping relation with the optical coupling-out configuration 108 (e.g., spanning across one or more of the partially reflective surfaces 108), instead of limited deployment at or near the distal end of the LOE 102 as illustrated in FIGS. 2A-3.

As mentioned above, in certain embodiments the optical element 122 may be polarization selective. The polarization selectivity may be instead of, or in addition to, the above-mentioned spectral selectivity. For example, the optical element 122 can be configured to transmit incident light that has a first polarization direction (e.g., s-polarized or p-polarized) relative to the surface of the optical element 122, and configured to reflect incident light that has a second polarization direction orthogonal to the first polarization direction (e.g., p-polarized or s-polarized). In one example case, the illumination arrangement 214 can include one or more sources of polarized light that produce NIR light that is p-polarized such that the light 124, 126, 128 is p-polarized NIR light. The image projector can produce light in the photopic region that is s-polarized such that illumination 160 is s-polarized visible light. In such an example case, the optical element 122 can be designed to apply no optical power to s-polarized light in the photopic region and to transmit s-polarized light in the photopic region, and to apply optical power (so as to collimate) NIR p-polarized light and to reflect NIR p-polarized light. As should be apparent, other combinations of spectral and polarization selectivity can be used in order to achieve discrimination between eye-tracking light and image light (from the image projector) by the optical element 122.

Figure 5:
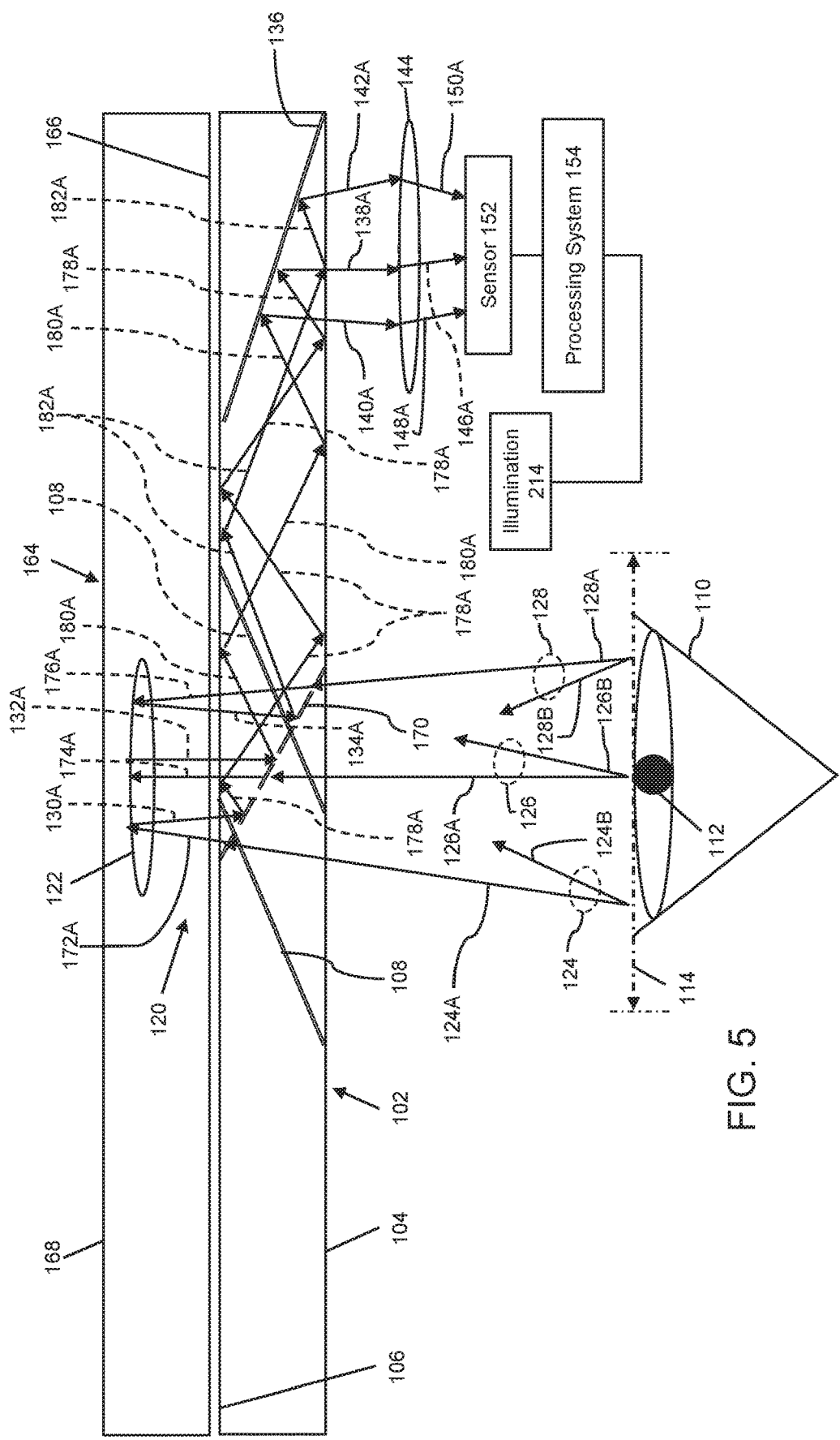
FIG. 5 is a schematic side view of an optical system, constructed and operative according to an embodiment of the present invention, that is similar to the optical system of FIGS. 2A-3 but in which the collimating component is deployed in a second light-transmitting substrate, and in which the optical coupling configuration includes a partial reflector deployed in the light-transmitting substrate.

Referring now to FIG. 5, there is shown an optical system according to another embodiment of the present invention. Here, the optical system includes a second light-transmitting substrate 164 formed from transparent material (such as glass) and having a pair of faces (major surfaces) 166, 168, and the optical element 122 of the optical coupling configuration 120 is deployed in the substrate 164 with the long-major axis of the optical element 122 parallel to the surfaces 104, 106 of the LOE 102. The substrate 164 is deployed with one of the major surfaces 166 in association with one of the major surfaces 106 of the LOE 102, such that the two surfaces 106, 166 are in facing relation to each other, and the other surface 168 is in facing relation to the real-world scene. As a result, the LOE 102 is positioned between the eye 110 and the substrate 164.

The LOE 102 and the substrate 164 are preferably constructed from materials having the same index of refraction, and may be attached to each other at the surfaces 106, 166 using an optical attachment material such as optical cement, gel, and the like. Preferably the optical attachment material is an index-matching material such that light passes from the LOE 102 to the substrate 164 (and vice versa) with neither reflection nor refraction.

In the illustrated embodiment, the optical coupling configuration 120 also includes a second optical element 170, which is a partially reflective surface that is deployed in the LOE 102 obliquely to the surfaces 104, 106. The optical element 170 functions to deflect collimated light from the optical element 122 so as to trap the deflected light by internal reflection within the LOE 102. Oblique deployment angles of the second optical element 170 in the range of 25°-35° have been found to be particularly suitable for achieving efficient trapping of light. In certain preferred but non-limiting implementations, the second optical element 170 is deployed at an angle of approximately 30° measured relative to the surfaces 104, 106. The deployment orientation of the optical element 170 is opposite that of the partially reflective surfaces 108, for reasons that will become clear when discussing the traversal of light from the eye 110 to the optical sensor 152. In addition, the optical element 170 can be deployed in overlapping relation with the partially reflective surfaces 108, as illustrated in FIG. 5. Although the optical element 170 is illustrated as a planar surface, the optical element 170 may be implemented as a curved surface.

The optical element 122 is preferably deployed in a region of the substrate 164 that is located approximately directly in front of the eye 110 such that the normal from the center of the optical collimating surface of the optical element 122 reaches the center (or approximately the center) of the pupil 112 of the eye 110. Such deployment increases the efficacy of the collimation employed by the optical element 122, since even the marginal rays of the beams 124, 126, 128 reach the optical element 122 at angles closer to the normal to the optical surface of the optical element 122 as compared with the marginal rays in the embodiment illustrated in FIGS. 2A-3.

The optical element 170 may be spectrally selective such that it is partially reflective (and therefore partially transmissive) to light in the eye-tracking spectrum. The reflectivity or transmissivity of the optical element 170 to light in the photopic spectrum can be configured according to the desired display characteristics of the optical system. For example, in certain non-limiting embodiments, the optical element 170 can be designed to reflect 50% of the intensity of light in the NIR region, and to transmit 100% of the intensity of light in the photopic region such that the image light propagating through the LOE 102 or coupled out by the partially reflective surfaces 108 (e.g., light 160, 162A, 162B, 162C in FIG. 3) is unaffected by the optical element 170.

The following paragraphs describe the traversal of light from the eye 110 to the optical sensor 152 by way of the optical coupling configuration 120 of FIG. 5. For simplicity of presentation, the traversal of only one sample ray for each of the beams 124, 126, 128 will be presented here. The light 124A, 126A, 128A from the eye 110 enters the LOE 102 via the surface 104 and reaches the optical element 170. Depending on the angle of incidence of the incoming light to the surface 104, some of the rays of one or more of the beams 124, 126, 128 may undergo refraction at the surface 104 before reaching the optical element 170. A proportion of the intensity of the light 124A, 126A, 128A is transmitted by the optical element (partially reflective surface) 170. The transmitted light is represented schematically in FIG. 5 as light rays 172A, 174A, 176A. The transmitted light 172A, 174A, 176A exits the LOE 102 through the surface 106, and then enters the substrate 164 through the surface 166. The light 172A, 174A, 176A then reaches the optical element 122 at which point the incident light is collimated and deflected by the optical element 122, thereby producing collimated light 130A, 132A, 134A that propagates back toward the surface 166 and exits the substrate 164 via the surface 166. The collimated light then 130A, 132A, 134A enters the LOE 102 through the surface 106, and reaches the optical element 170. A proportion of the intensity of the collimated light 130A, 132A, 134A is reflected by the optical element 170 to generate reflected light (represented schematically in FIG. 5 as light rays 178A, 180A, 182A). The optical element 170 deflects the collimated light 130A, 132A, 134A at an appropriate angle such that the resultant reflected light 178A, 180A, 182A is trapped (i.e., guided) within the LOE 102 by internal reflection at the surfaces 104, 106. The trapped light 178A, 180A, 182A propagates through the LOE 102 by internal reflection until reaching the second optical coupling configuration 136, which couples the light 178A, 180A, 182A out of the LOE 102 as coupled-out light 138A, 140A, 142A. The coupled-out light 138A, 140A, 142A then reaches the imaging module, whereupon the lens 144 converts the collimated coupled-out light 138A, 140A, 142A into one or more sets of converging beams of captured light (146A, 148A, 150A) which then reach the optical sensor 152 which generates signals that are processed by the processing system 154 to derive gaze direction of the eye 110.

In certain embodiments, the optical element 170 can be polarization selective instead of, or in addition to, being spectrally selective. For example, the optical element 170 can be designed to transmit all polarized light in the photopic region, and to transmit s-polarized or p-polarized eye-tracking light (e.g., in the NIR region) and to reflect p-polarized or s-polarized eye-tracking light. In such an example, the light 172A, 174A, 176A is s-polarized or p-polarized, and a retardation plate such as a half wave plate (not shown) can be deployed parallel to the surface 106 between the substrate 164 and the LOE 102 such that the light 172A, 174A, 176A passes through the retardation plate and is converted to circularly polarized light. The optical element 122 collimates the circularly polarized light, to produce circularly polarized collimated light 130A, 132A, 134A. The circularly polarized collimated light 130A, 132A, 134A then passes back through the retardation plate which converts the circularly polarized collimated light 130A, 132A, 134A into p-polarized or s-polarized collimated light, which is reflected by the optical element 170 to produce p-polarized or s-polarized collimated light 178A, 180A, 182A that is trapped within the LOE 102 by internal reflection.

It is noted that FIG. 5 illustrates a non-limiting configuration of the substrate 164 in which the substrate 164 is implemented as a slab-type substrate. In such a configuration, the surfaces 166, 168 are parallel to each other and parallel to the surfaces 104, 106. However, the requirements for parallelism between the principal planes of the substrate 164 (i.e., the surfaces 166, 168) is much more lenient than for the LOE 102 used for image projection to the eye 110, where parallelism on the order of about 1 arcmin may be required. It should therefore be appreciated that other non-limiting configurations of the substrate 164 can be implemented, including configurations in which one or both of the surfaces 166, 168 are curved surfaces and/or in which the substrate 164 is formed as a lens that provides optical power to incident light from the real-world scene that is directly viewable to the eye 110 of the viewer. Alternatively, or in addition to such curved/lens configurations, the substrate 164 can be configured with reflection suppressing components having some degree of curvature in order to reduce ghost images that are induced by light rays from the real-world scene that are incident to the substrate 164 at certain angles of incidence.

Although FIG. 5 illustrates a particular configuration in which the optical element 122 is deployed in a second substrate 164 and the partially reflective optical element 170 is deployed in the LOE 102, other implementations are contemplated herein in which no second substrate 164 employed and both optical elements 122, 170 are deployed in the LOE 102. It is noted however that the size/dimensions of the optical element 122 may need to be reduced in order to ensure that both optical elements 122, 170 fit within the LOE 102, which may reduce the angular range of the illumination from the eye 110 that can reach the collimator-coupler 120, thereby potentially reducing the accuracy of the gaze direction determination.

Figure 6:
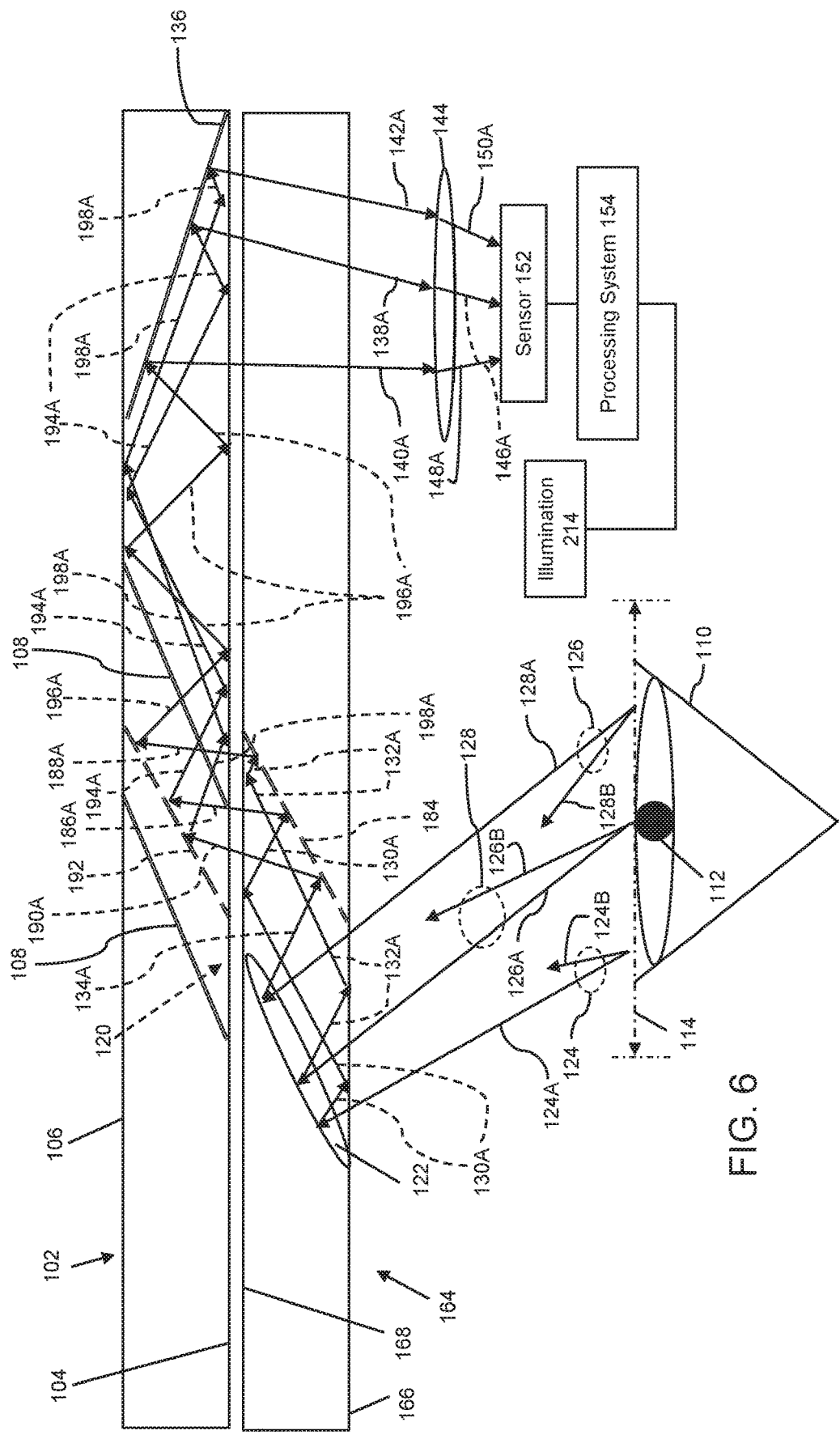
FIG. 6 is a schematic side view of an optical system, constructed and operative according to an embodiment of the present invention, that is similar to the optical system of FIG. 5 but in which the optical coupling configuration includes the collimating component and two reflectors or partial reflectors, and in which the collimating component and one of the two reflectors are deployed in a second light-transmitting substrate, and in which the other of the two reflectors is deployed in the light-transmitting substrate.

Referring now to FIG. 6, there is shown an optical system according to another embodiment of the present invention. Similar to the embodiment of FIG. 5, the embodiment illustrated in FIG. 6 employs a second substrate 164. However, in the embodiment of FIG. 6 the second substrate 164 is deployed with the major surface 168 in association with the major surface 104 of the LOE 102 such that the substrate 164 is positioned between the eye 110 and the LOE 102. Thus, the surfaces 168, 104 are in facing relation to each other, and the other surface 166 is in facing relation to the eye 110. The LOE 102 and the substrate 164 may be attached to each other at the surfaces 104, 168 using an optical attachment material such as optical cement, gel, and the like. Preferably the optical attachment material is an index-matching material such that light passing from the LOE 102 to the substrate 164 (and vice versa) with neither reflection nor refraction.

In the embodiment of FIG. 6, the optical coupling configuration 120 further includes two optical elements 184, 192, which are reflective or partially reflective surfaces. Although both of the optical elements 184, 192 are is illustrated as being planar surfaces, either or both of the optical elements 184, 192 can be implemented as a curved surface. The optical elements 122, 184 are deployed within the substrate 164 obliquely to the major surfaces 104, 106 (and obliquely to the major surfaces 166, 168 when the surfaces 166, 168 are parallel to each other and parallel to the surfaces 104, 106). The optical element 192 is deployed in the LOE 102 obliquely to the surfaces 104, 106. Generally speaking, the optical element 184 functions to redirect the collimated light from the optical element 122 toward the other optical element 192, which deflects the received redirected collimated light so as to couple the collimated light into the LOE 102 by internal reflection. Oblique deployment angles of the optical element 184 in the range of 25°-35° have been found to be particularly suitable for achieving efficient redirection of light toward the optical element 192. In certain preferred but non-limiting implementations, the optical element 184 is deployed at an angle of approximately 30° measured relative to the surfaces 104, 106. Similarly, oblique deployment angles the optical element 192 in the range of 25°-35° have been found to be particularly suitable for achieving efficient trapping of light. In certain preferred but non-limiting implementations, the optical element 192 is deployed at an angle of approximately 30° measured relative to the surfaces 104, 106 The deployment orientation of the optical elements 122, 184, 192 is opposite that of the partially reflective surfaces 108, for reasons that will become clear when discussing the traversal of light from the eye 110 to the optical sensor 152. Preferably, the optical elements 184, 192 are aligned with each other such that the projections of the optical elements 184, 192 in a plane parallel to the principal plane (surfaces 104, 106) of the LOE 102 mutually and completely overlap each other.

The following paragraphs describe the traversal of light from the eye 110 to the optical sensor 152 by way of the optical coupling configuration 120 of FIG. 5. For simplicity of presentation, the traversal of only one sample ray (124A, 126A, 128A) for each of the beams 124, 126, 128 will be presented here.

The light 124A, 126A, 128A from the eye 110 enters the substrate 164 via the surface 166 and reaches the optical element 122. Depending on the angle of incidence of the incoming light to the surface 166, some of the rays of one or more of the beams 124, 126, 128 may undergo refraction at the surface 166 before reaching the optical element 122. The light 124A, 126A, 128A is collimated and deflected by the optical element 122, thereby producing collimated light 130A, 132A, 134A. The collimated light 130A, 132A, 134A reaches the optical element 184, which redirects (reflects) the collimated light 130A, 132A, 134A toward the optical element 192. The redirected (reflected) light is represented schematically in FIG. 5 as light rays 186A, 188A, 190A.

Parenthetically, some of the collimated light 130A, 132A, 134A may propagate by internal reflection at one or both of the surfaces 166, 168 before reaching the optical element 184. For example, in FIG. 5 the light rays 124A and 126A are reflected at the surfaces 166, 168 by internal reflection before reaching the optical element 184. Thus, to ensure proper redirection of collimated light by the optical element 184, the portions of the surfaces 166, 168 in the region of the substrate 164 in which the optical elements 122, 184 are deployed should preferably be parallel or as close to parallel as possible.

The redirected light 186A, 188A, 190A exits the substrate 164 via the surface 168, enters the LOE 102 through the surface 104, and reaches the optical element 192 which reflects the light 186A, 188A, 190A to produce light 194A, 196A, 198A. The optical element 192 deflects the light 188A, 190A, 192A at an appropriate angle such that the resultant light 194A, 196A, 198A is trapped (i.e., guided) within the LOE 102 by internal reflection at the surfaces 104, 106. The trapped light 194A, 196A, 198A propagates through the LOE 102 by internal reflection until reaching the second optical coupling configuration 136, which couples the light 194A, 196A, 198A out of the LOE 102 (via the surface 104) and then out of the substrate 164 (via the surface 166) as coupled-out light 138A, 140A, 142A. The coupled-out light 138A, 140A, 142A then reaches the imaging module, whereupon the focusing optics 144 convert the collimated coupled-out light into one or more sets of converging beams of captured light which then reach the optical sensor 152 which generates signals that are processed by the processing system 154 to derive gaze direction of the eye 110.

The substrate 164 of the embodiment of FIG. 6 can be a slab-type substrate. However, similar to as discussed with reference to FIG. 5, the requirements for parallelism between the principal planes of the substrate 164 (i.e., the surfaces 166, 168) is much more lenient than for the LOE 102 used for image projection to the eye 110. However, as mentioned above, the segments of the surfaces 166, 168 in the region of the substrate 164 in which the optical elements 122, 184 are deployed should be parallel or as close to parallel as possible. Bearing this in mind, the substrate 164 may still exhibit some degree of curvature outside of these regions. Thus, the substrate 164 may still be implemented with some degree of curvature or formed as a lens, similar to as discussed with reference to FIG. 5.

Figure 7:
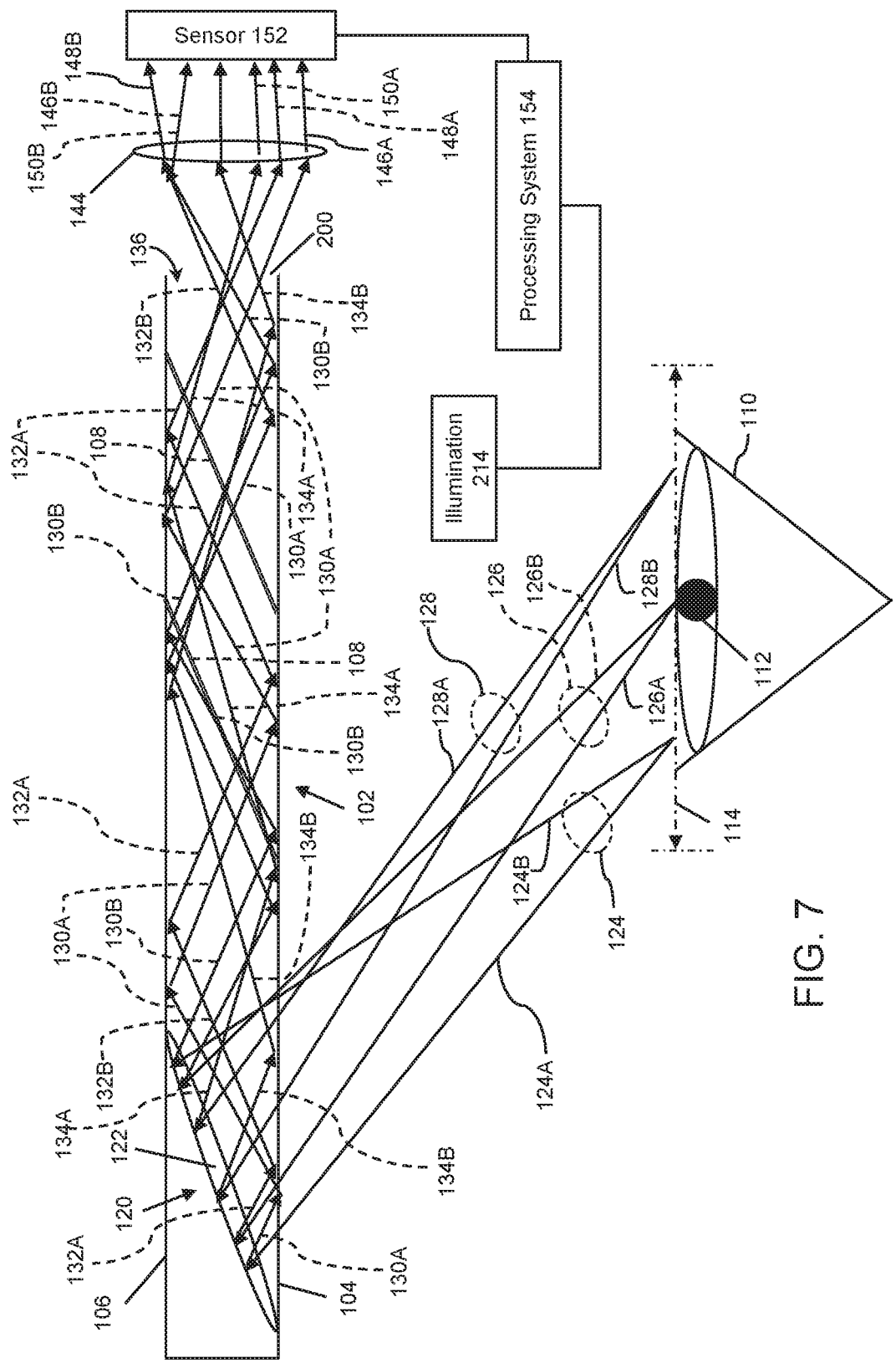
FIG. 7 is a schematic side view of an optical system, constructed and operative according to an embodiment of the present invention, that is similar to the optical system of FIG. 2A but in which the second optical coupling configuration is implemented as a planar open end of the light-transmitting substrate.

Although the embodiments discussed thus far have pertained to the optical coupling configuration 136 being a reflective surface (or a coupling prism or other coupling surface), other embodiments are contemplated herein in which the optical coupling configuration is not a surface, but is rather an open end of the LOE 102. In such embodiments, the open end may be implemented by way of cutting or slicing the LOE 102 along a plane that is normal (orthogonal) to the surfaces 104, 106. FIG. 7 illustrates an example of such an embodiment as a modification of the embodiment illustrated in FIGS. 2A and 2B (without the partially reflective surfaces 108 for simplicity of presentation), where the optical coupling configuration 136 includes a planar open end 200 formed by cutting the substrate at or near the proximal end of the LOE 102 along a plane that is orthogonal to the two major surfaces 104, 106 of the LOE 102. The cutting plane is also normal to the direction of elongation of the LOE 102, which in FIG. 7 is along the horizontal axis. As can be seen, the collimated light from the eye (represented in FIG. 7 by light rays 130A, 130B, 132A, 132B, 134A, 134B), reaches the open end 200 and naturally exits the LOE 102 as coupled-out light 130A, 130B, 132A, 132B, 134A, 134B.

The imaging module 145 is deployed with the lens 144 in association with the open end 200. The lens 144 is deployed such that two images are formed on two respective sides (halves) of the detector surface of the optical sensor 152. In particular, the lens 144 focuses the coupled-out light 130A, 130B, 132A, 132B, 134A, 134B such that the light rays 130A, 132A, 134A whose last reflection within the LOE 102 was from the surface 104 are converted into different converging beams of captured light that reach different corresponding portions of the bottom half of the detector surface of the optical sensor 152, and such that the light rays 130B, 132B, 134B whose last reflection within the LOE 102 was from the surface 106 are converted into different converging beams of captured light that reach different corresponding portions of the top half of the detector surface of the optical sensor 152. In FIG. 7, the lens 144 converts the light 130A, 132A, 134A into respective converging beams 146A, 148A, 150A, and converts the light 130B, 132B, 134B into respective converging beams 146B, 148B, 150B. The optical sensor 152 generates signals that are processed by the processing system 154 to determine gaze direction. In determining the gaze direction, the processing system 154 first combines the two images together to produce a single image having evenly distributed intensity, and thereby improving the quality of the determined gaze direction.

Although the configuration of the LOE 102 illustrated in the embodiment of FIG. 7 is shown as a modification of the embodiment of FIGS. 2A and 2B, the configuration of FIG. 7 can be used with any of the previously discussed embodiments of the optical coupling configuration 120. However, it is noted that employment of the planar open end 200 may be most effective when used with the embodiment of the optical coupling configuration 120 described with reference to FIGS. 2A and 2B to avoid unnecessary cutting of the substrate 164. Furthermore, employment of the open end 200 can also be used in embodiments together with a separate optical coupling-in configuration, such as a reflective surface or coupling prism, that couples collimated image light from the image projector into the LOE 102, so long as the coupling-in configuration transmits the collimated light from the eye.

It is noted that the eye-tracking apparatus of the embodiments described thus far can be used to advantage independently of a display system, for example, in non-AR/VR applications in which determination of eye-gaze direction is desirable. For example, the eye-tracking apparatus of the embodiments of the present disclosure can be used in combination with computer or mobile device related applications in which the gaze direction of a user's eye may be used to navigate a display screen, webpage, menu or the like, or may be used to interact with a computerized game played on a computer device (e.g., video game system, mobile device, laptop computer, table, etc.). In such applications, the "LOE" may include the display screen of the computer device, and the collimator-coupler 120 can be appropriately associated with portions of the display screen so as to collimate and deflect eye-tracking light that is reflected from the eye toward the display screen.

Notwithstanding the above, the various eye-tracking apparatus according to the embodiments of the present invention are particularly well-suited for AR and/or VR display system applications, in which a scene image is generated by a small optical image generator (image projector) having a small aperture that is multiplied to generate a large aperture and displayed to the eye of a viewer using an optical waveguide/substrate (i.e., LOE) with partially reflective surfaces (or another type of optical coupling-out arrangement). The following paragraphs describe embodiments of optical systems that combine eye-tracking and display functionality, with particular focus on the structure and operation of the image projector that produces the image to be displayed to the eye, and the imaging/camera system that images the eye for eye-tracking purposes.

Figure 8:
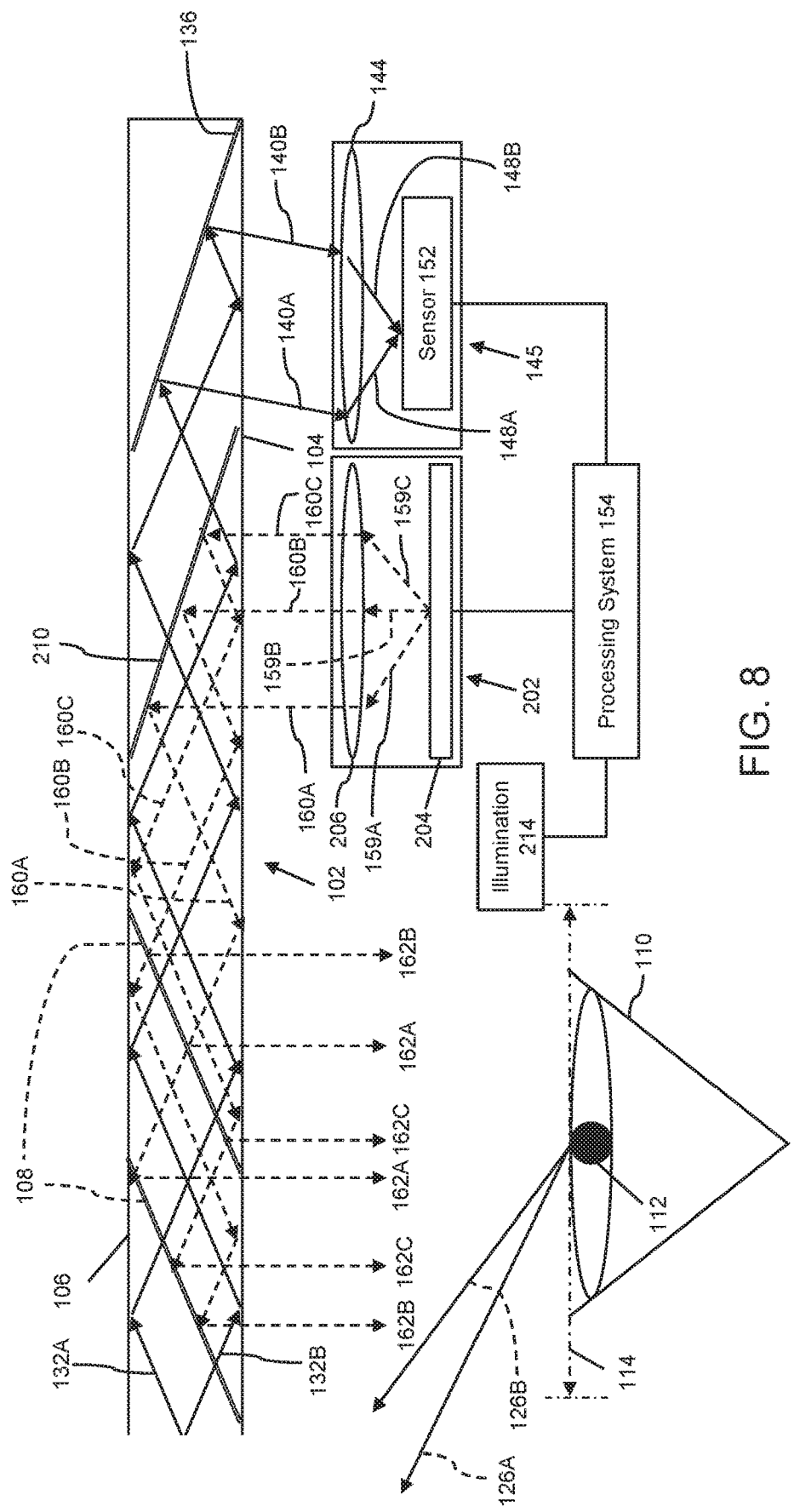
FIG. 8 is a schematic side view of an optical system, constructed and operative according to an embodiment of the present invention, that is similar to the optical system of FIGS. 2A-3, showing an image projector arrangement for generating collimated image light that is coupled into the light-transmitting substrate, an optical coupling-out configuration for coupling the collimated image light out of the light-transmitting substrate, and an imaging system for imaging light from the eye that is coupled out of the light-transmitting substrate.

With reference to FIG. 8, there is shown an optical system according to an embodiment of the present invention that is similar to the embodiment illustrated in FIGS. 2A-3. In the illustrated embodiment, the image light that is generated by the image projector 202 is coupled into the LOE 102 by an optical coupling-in configuration 210 (schematically represented in the drawings as a reflecting surface, but which may also be implemented as a coupling prism or other coupling optical arrangement) that is separate from the optical coupling configuration 136. Here, the optical coupling configuration 136 only functions to couple eye-tracking light out of the LOE 102 toward the imaging module 145. For simplicity of presentation, the LOE 102 is illustrated in FIG. 8 with only the portions having the partially reflective surfaces 108, the optical coupling-in configuration 210, and the optical coupling configuration 136.

In the illustrated embodiment, the image projector 202 includes a spatial light modulator (SLM) 204, such as an LCoS chip, for generating image light (shown in FIG. 8 as image light having sample rays 159A, 159B, 159C), and collimating optics 206 for collimating the image 159A, 159B, 159C to infinity to produce a collimated beam having sample rays 160A, 160B, 160C that span the beam. An illumination source, such as one or more LEDs (not shown) are typically used to illuminate the SLM 204 to drive the image generation. The SLM 204, collimating optics 206, and the illumination source can be suitable arranged on surfaces of one or more polarization beamsplitter (PBS) cube or other prism arrangement.

The beam 160A, 160B, 160C is coupled into the LOE 102 by the optical coupling-in configuration 210, such that the coupled in light 160A, 160B, 160C is trapped within the LOE 102 by internal reflection. The image 160A, 160B, 160C propagates along the LOE 102 in the forward direction by repeated internal reflection between the faces 104, 106 until reaching the partially reflective surfaces 108, where part of the image intensity is reflected so as to be coupled out of the LOE 102 as rays 162A, 162B, 162C toward the eye 110. The rays 159A, 159B, 159C, 160A, 160B, 160C, 162A, 162B, 162C are denoted in FIG. 8 with broken line arrows in order to more clearly differentiate the image light from the eye-tracking light.

Illumination from the eye (for simplicity of presentation only beam 126A, 126B, emanating from the center of the EMB 114, is shown in FIG. 8) is collimated and coupled into the LOE 102 by a collimator-coupler (not shown in FIG. 8, but which can be any of the collimator-couplers discussed herein, for example, the collimator-coupler 120 of FIG. 2A), such that the collimated light 132A, 132B produced by the collimator-coupler is trapped within the LOE 102 by internal reflection. The light 132A, 132B propagates along the LOE 102 in the reverse direction by repeated internal reflection between the faces 104, 106 until reaching the optical coupling configuration 136, which reflects the light 132A, 132B so as to couple the light 132A, 132B out of the LOE 102 as coupled-out light 140A, 140B. The coupled-out light 140A, 140B is then focused by focusing optics 144 (producing converging beam 148A, 148B) onto the optical sensor 152.

In order for the light 132A, 132B propagating along the LOE 102 to reach the optical coupling configuration 136, the optical coupling-in configuration 210 (deployed between the optical coupling configuration 136 and the partially reflective surfaces 108) should be selectively reflective, i.e., discriminate between eye-tracking light 132A, 132B and the image light 160A, 160B, 160C, such that the optical coupling-in configuration 210 transmits eye-tracking light and reflects the image light. In one non-limiting example, the light discrimination of the optical coupling-in configuration 210 can be effectuated by implementing the optical coupling-in configuration 210 as a spectrally selective surface, such as a dichroic surface, that reflects light (e.g., image 160A, 160B, 160C) in the photopic region and transmits light (e.g., light 132A, 132B) in the NIR region. In another non-limiting example, the light discrimination of the optical coupling-in configuration 210 can be effectuated by implementing the optical coupling-in configuration 210 as a polarization selective surface that reflects s-polarized or p-polarized light (where the image light 160A, 160B, 160C is s-polarized or p-polarized), and transmits p-polarized or s-polarized light (where the eye-tracking light 132A, 132B is p-polarized or s-polarized light). In yet further non-limiting examples, combinations of spectral selectivity and polarization selectivity can be used.

In certain embodiments, the positions of the optical coupling-in configuration 210 and the optical coupling configuration 136 can be exchanged. In such embodiments, the positions of the image projector 202 and the imaging module 145 should also be exchanged, and the optical coupling-in configuration 210 no longer needs to be selectively reflective (light discriminating). However, to effectuate proper coupling into and out of the LOE 102, the optical coupling configuration 136 should be selectively reflective (light discriminating) such that the optical coupling configuration 136 transmits the image light corresponding to the collimate image (e.g., light 160A, 160B, 160A) and reflects the collimated eye-tracking light (e.g., light 132A, 132B).

Figure 9:
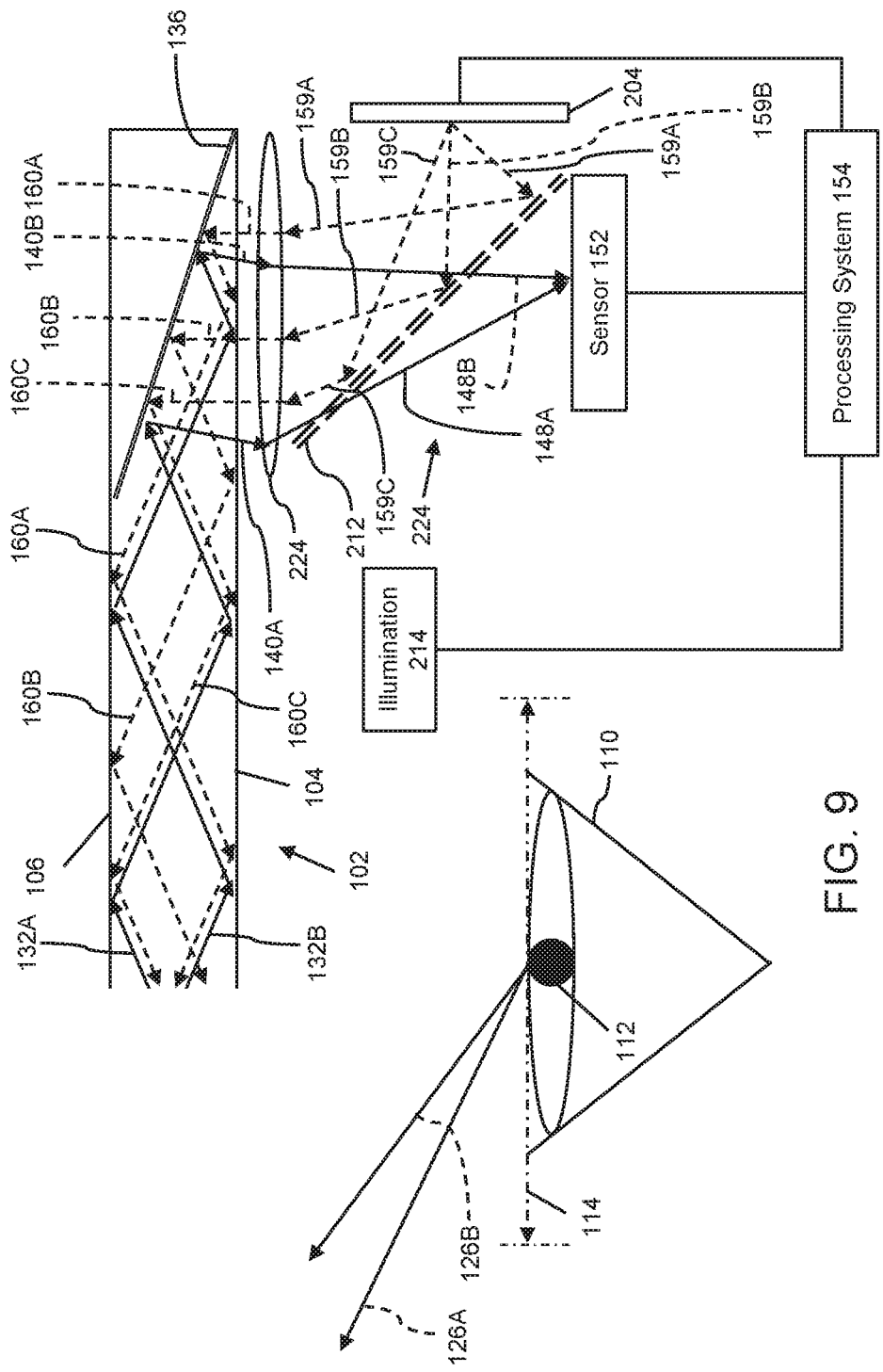
FIG. 9 is a schematic side view of an optical system, constructed and operative according to an embodiment of the present invention, that is similar to the optical system of FIG. 8 but in which the components of the image projector and the imaging system are integrated into a single module.

FIG. 9 shows another embodiment of the optical system that employs a compact configuration in which the imaging module and the image projector share common components so as to be integrated into a single imaging and projector module 224. In such an embodiment, the optical coupling configuration 136 functions to couple the collimated image light 160A, 160B, 160C into the LOE 102, and further functions to couple the eye-tracking light 132A, 132B out of the LOE 102 as coupled-out light 140A, 140B. For simplicity of presentation, the LOE 102 is illustrated in FIG. 9 with only the portions having the optical coupling configuration 136.

The module 224 includes the SLM 202 (e.g., LCoS chip), optics 226, and the optical sensor 152. The optics 226 performs the dual functionality of collimating the image light 159A, 159B, 159C generated by the SLM 202 to produce collimated beam 160A, 160B, 160C, as well as focusing the coupled-out eye-tracking light 140A, 140B onto the optical sensor 152 as a converging beam.

The optical sensor 152 and the SLM 202 are deployed such that the principal planes of the optical sensor 152 and the SLM 202 are orthogonal to each other. The module 224 further includes a light discriminating surface 212 (which can be a spectrally selective and/or polarization selective surface) deployed oblique to the principal planes of the optical sensor 152 and the SLM 202, preferably at a 45º angle. The light discrimination properties of the surface 212 are such that the surface 212 reflects or transmits the image light 159A, 159B, 159C, and transmits or reflects the eye-tracking light 140A, 140B.

In the non-limiting example configuration illustrated in FIG. 9, in which the optical sensor 152 is deployed with its principal plane parallel to the surface 104 (and with the SLM 202 deployed with its principal plane orthogonal to the surface 104), the surface 212 is configured to reflect the image light 159A, 159B, 159C and to transmit the eye-tracking light 140A, 140B. The reflected image light 159A, 159B, 159C reaches the optics 226, which collimates the image light 159A, 159B, 159C to produce collimated light 160A, 160B, 160C. The collimated light 160A, 160B, 160C is then coupled into the LOE 102 by the optical coupling configuration 136, whereby the collimated light is guided through the LOE 102 by internal reflection in the forward direction until reaching the optical coupling-out configuration, e.g., partially reflective surfaces (not shown in FIG. 9), which couples a proportion of the intensity of the light out of the LOE 102.

Illumination from the eye (for simplicity of presentation only beam 126A, 126B, emanating from the center of the EMB 114, is shown in FIG. 9) is collimated and coupled into the LOE 102 by a collimator-coupler (not shown in FIG. 9, but which can be, for example, the collimator-coupler 120 of FIG. 2A), such that the collimated light 132A, 132B produced by the collimator-coupler is trapped within the LOE 102 by internal reflection. The light 132A, 132B propagates along the LOE 102 in the reverse direction by repeated internal reflection between the faces 104, 106 until reaching the optical coupling configuration 136, which reflects the light 132A, 132B so as to couple the light 132A, 132B out of the LOE 102 as coupled-out light 140A, 140B. The coupled-out light 140A, 140B is then focused by optics 226 to produce converging beam 148A, 148B. The converging beam 148A, 148B reaches the surface 212 which transmits the converging beam 148A, 148B such that the converging beam 148A, 148B reaches the optical sensor 152.

Although FIG. 9 illustrates a particular non-limiting deployment configuration of the module 224 in which the optical sensor 152 is deployed with its principal plane parallel to the surface 104, deployment configurations are possible in which the positions of the optical sensor 152 and the SLM 202 are exchanged. In such configurations, the surface 212 is operative to transmit the image light 159A, 159B, 159C and to reflect the eye-tracking light 140A, 140B.

It is further noted that since a single optical coupling configuration 136 is used for coupling image light into the LOE 102 and for coupling eye-tracking light out of the LOE 102, the optical coupling configuration 136 can have general reflective characteristics such that it is reflective for all types of incident light regardless of the optical spectrum and/or polarization state of the incident light.

Although the embodiments of the optical systems described thus far have pertained to an optical coupling-out configuration implemented as a set of partially reflective surfaces 108 for coupling image light (from the image projector) out of the LOE 102, the partially reflective surfaces 108 are merely illustrative of one non-limiting optical coupling configuration, and other optical coupling configurations can be used to couple eye tracking light into, and image light out of, the LOE 102. The optical coupling configuration may be any optical coupling arrangement which deflects part of the image incident radiation (from the image projector) already propagating within the LOE 102 by internal reflection to an angle such that the deflected part of the image incident radiation exits the LOE 102. Other examples of such suitable optical coupling arrangements include, but are not limited to, one or more diffractive optical elements deployed on either of the faces 104, 106. Furthermore, although only two partially reflective surfaces 108 are illustrated for simplicity of presentation, the optical coupling-out configuration (when implemented as a set of partially reflective surfaces) can include any number of such partial reflectors supported by the optical design of the apparatus, including implementations using five or more partial reflectors, or ten or more partial reflectors.

The embodiments of the optical system have thus far been described within the context of a light-guide optical element (LOE) configured to guide image light (injected from an image projector 202) by internal reflection. Such embodiments are of particular value when used in AR and/or VR applications, where the AR/VR image is produced by a compact image projector having a small aperture that is multiplied by the LOE to generate a large aperture. As discussed in the background section, aperture multiplication in one dimension has been developed based on a parallel-faced slab of transparent material within which the image propagates by internal reflection. It is noted that aperture multiplication in two dimensions has also been developed using various optical waveguide configurations.

One example of a two-dimensional (2D) aperture multiplier employs a pair of optical waveguides. The first optical waveguide has two pairs of parallel major external surfaces that form a rectangular cross-section. A first set of mutually parallel partially reflective surfaces traverse the first optical waveguide oblique to a direction of elongation of the optical waveguide. The second optical waveguide, optically coupled to the first optical waveguide, has a pair of parallel major external surfaces forming a slab-type waveguide. A second set of mutually parallel partially reflective surfaces traverse the second optical waveguide oblique to the major external surfaces of the second optical waveguide. In addition, the planes containing the first set of partially reflective surfaces are preferably oblique to the planes containing the second set of partially reflective surfaces. The optical coupling between the two optical waveguides, and the deployment and configuration of the two sets of partially reflective surfaces are such that, when an image is coupled into the first optical waveguide with an initial direction of propagation at a coupling angle oblique to both pairs of parallel major external surfaces of the first optical waveguide, the image advances by four-fold internal reflection along the first optical waveguide (i.e., in two dimensions), with a proportion of intensity of the image reflected at the first set of partially reflective surfaces so as to be coupled out of the first optical waveguide and into the second optical waveguide, and then propagates through two-fold internal reflection within the second optical waveguide (i.e., in one dimension), with a proportion of intensity of the image reflected at the second set of partially reflective surfaces so as to be coupled out of the second optical waveguide as a visible image seen by the eye of an observer. Further details of such two-dimensional aperture multipliers can be found in various patent documents, including, for example, U.S. Pat. No. 10,564,417, which is incorporated by reference in its entirety herein.

In another example of a two-dimensional aperture multiplier, the first optical waveguide has two pairs of parallel major external surfaces forming a slab-type waveguide. A first set of mutually parallel internal partially reflective surfaces traverse the first optical waveguide at an oblique angle to the two pairs of parallel major external surfaces. The second optical waveguide also has two pairs of parallel major external surfaces. A second set of mutually parallel internal partially reflective surfaces traverse the second optical waveguide at an oblique angle to the two pairs of parallel major external surfaces of the second optical waveguide. In addition, the planes containing the first set of partially reflective surfaces are oblique or perpendicular to the planes containing the second set of partially reflective surfaces. The optical coupling between the two optical waveguides, and the deployment and configuration of two sets of partially reflective surfaces are such that, when an image is coupled into the first optical waveguide, the image propagates through two-fold internal reflection within the first optical waveguide between the external surfaces of one of the pairs of external surfaces in a first guided direction, with a proportion of intensity of the image reflected at the first set of partially reflective surfaces so as to be coupled out of the first optical waveguide and into the second optical waveguide, and then propagates through two-fold internal reflection within the second optical waveguide between the external surfaces of one of the pairs of external surfaces of the second optical waveguide in a second guided direction (oblique to the first guided direction), with a proportion of intensity of the image reflected at the second set of partially reflective surfaces so as to be coupled out of the second optical waveguide as a visible image seen by the eye of an observer. Further details of such two-dimensional aperture multipliers can be found in various patent documents, including, for example, U.S. Pat. No. 10,551,544, which is incorporated by reference in its entirety herein.

The eye-tracking techniques according to the embodiments of the present disclosure are applicable to two-dimensional aperture multipliers. For example, the collimator-coupler 120 and the optical coupling configuration 136 of FIG. 2A can be deployed in any of the above-mentioned second optical waveguides (which can function similar to the LOE 102 described herein) used for 2D aperture multiplication (expansion). The eye-tracking light will propagate by internal reflection through the second optical waveguide, and will be coupled into the corresponding first optical waveguide by the optical coupling configuration 136, where the eye-tracking light advances by internal reflection through the first optical waveguide. Another optical coupling configuration (similar to the optical coupling configuration 136) can be deployed in the first optical waveguide to couple the eye-tracking light out of the first optical waveguide toward an imaging module, deployed at the exit aperture of the first optical waveguide.

Although the embodiments of the present disclosure have been described within the context of an illumination arrangement 214 deployed to illuminate the eye with light that is preferably in the NIR region of the electromagnetic spectrum, the embodiments of the present disclosure should not be limited to illumination arrangements that emit eye-tracking light in any specific region of the electromagnetic spectrum. The description of using NIR light for eye-tracking purposes is for example purposes in order to provide a clearer explanation of the construction and operation of the various apparatus of the present disclosure. Other types of light may also be used for eye-tracking purposes, including, but not limited to, visible light, light in the infrared region, and ultra-violet (UV) light. In embodiments in which the illumination arrangement 214 illuminates the eye with visible light, it may be advantageous to deploy the illumination source(s) to concentrate illumination on regions of the eye that are less sensitive to visible light, such as the sclera, so as to refrain from bombarding the eye with nonimage visible light. In embodiments in which the illumination arrangement 214 illuminates the eye with UV light, precautions should be taken to lessen or minimize the exposure of the eye to harmful UV radiation, for example by placing limits on the intensity/power of the UV beam received on a region of the eye of a given area over a given duration (for example less than 1 milliwatt per square centimeter for periods greater than 1000 seconds for UV light having wavelength in the range of 315 nm-400 nm).

According to certain non-limiting implementations, the various optical systems of the present disclosure may be duplicated for tracking both eyes of a subject simultaneously, as well as for projecting images to both eyes. By combining data from two eye trackers, it may be possible to achieve enhanced stability and continuity of tracking. For example, while the eyes are moving, the trackable portions of the eyes may be visible to the tracker in one eye and not the other. If a tracking algorithm is used which employs tracking of trackable features, simultaneous tracking for both eyes allow the tracking to be maintained continuously through periods in which only one eye-tracker can track the blind spot.

Where an optical system is binocular, each eye has its own image projection and eye tracking device, and various processing and power-supply components may optionally be shared between the two eye-tracking systems. The eye-tracking information gleaned by the binocular eye-tracking devices can be fused in order to provide enhanced stability and continuity of tracking, as mentioned above.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An optical system, comprising:
a light-transmitting substrate having at least two major surfaces deployed with a first of the major surfaces in facing relation to an eye of a viewer for guiding light by internal reflection between the two major surfaces of the light-transmitting substrate;
an optical coupling-out configuration associated with the light-transmitting substrate for coupling image light corresponding to a collimated image, guided by internal reflection between the two major surfaces, out of the light-transmitting substrate for viewing by the eye of the viewer;
a first optical coupling configuration comprising a curved surface embedded within the light-transmitting substrate, the curved surface being reflective to at least one wavelength of light reflected from the eye, the curved surface having a curvature sufficient to collimate light reflected from the eye to produce collimated light, and being oriented to couple the collimated light into the light-transmitting substrate so as to propagate within the light-transmitting substrate by internal reflection;
a second optical coupling configuration associated with the light-transmitting substrate configured to couple the collimated light out of the light-transmitting substrate as coupled-out light;
an optical sensor deployed for sensing the coupled-out light; and
at least one processor in communication with the optical sensor and configured to process signals from the optical sensor to derive a current gaze direction of the eye.

2. The optical system of claim 1, wherein the optical coupling-out configuration includes a plurality of partially reflective surfaces deployed within the light-transmitting substrate obliquely to the two major surfaces of the light-transmitting substrate.

3. The optical system of claim 1, wherein the optical coupling-out configuration includes a diffractive element associated with one of the two major surfaces of the light-transmitting substrate.

4. The optical system of claim 1, wherein the light from the eye is in a first optical spectrum, and wherein the image light is in a second optical spectrum.

5. The optical system of claim 1, wherein the second optical coupling configuration is further configured to couple the image light corresponding to the collimated image into the light-transmitting substrate so as to propagate within the light-transmitting substrate by internal reflection.

6. The optical system of claim 5, further comprising: a selectively reflective surface that transmits or reflects the image light corresponding to the collimated image toward the second optical coupling configuration, and reflects or transmits the coupled-out light from the second optical coupling configuration toward the optical sensor.

7. The optical system of claim 1, further comprising: an optical coupling-in configuration associated with the light-transmitting substrate for coupling the image light corresponding to the collimated image into the light-transmitting substrate so as to propagate within the light-transmitting substrate by internal reflection.

8. The optical system of claim 7, wherein the optical coupling-in configuration reflects the image light corresponding to the collimated image, and transmits the collimated light propagating within the light-transmitting substrate toward the second optical coupling configuration.

9. The optical system of claim 7, wherein the image light corresponding to the collimated image that is coupled into the light-transmitting substrate by the optical coupling-in configuration so as to propagate within the light-transmitting substrate by internal reflection reaches the second optical coupling configuration, and wherein the second optical coupling configuration transmits the image light corresponding to the collimated image propagating within the light-transmitting substrate.

10. The optical system of claim 1, further comprising: optics deployed in an optical path from the second optical coupling configuration to the optical sensor for forming at least one image of at least a portion of the eye on the optical sensor.

11. The optical system of claim 1, wherein the curved surface reflects light from the eye and transmits the image light corresponding to the collimated image.

12. The optical system of claim 1, wherein the second optical coupling configuration includes a reflecting surface that deflects the collimated light out of the light-transmitting substrate.

13. The optical system of claim 1, wherein the second coupling configuration includes a planar open end of the light-transmitting substrate, wherein the open end is formed by cutting the light-transmitting substrate along a plane that is orthogonal to the two major surfaces of the light-transmitting substrate.

* * * * *